US012744762B2

(12) United States Patent
Zarcone

(10) Patent No.: US 12,744,762 B2
(45) **Date of Patent: *Sep. 22, 2026**

(54) PROTOCOL OBFUSCATION IN MOVING TARGET DEFENSE

(71) Applicant: Comcast Cable Communications, LLC, Philadelphia, PA (US)

(72) Inventor: Christopher Zarcone, Marlton, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 30 days.

This patent is subject to a terminal disclaimer.

(21) Appl. No.: 18/528,319

(22) Filed: Dec. 4, 2023

(65) Prior Publication Data

US 2024/0364663 A1 Oct. 31, 2024

Related U.S. Application Data

(63) Continuation of application No. 15/373,163, filed on Dec. 8, 2016, now Pat. No. 11,876,786.

(51) Int. Cl.

| | |
|---|---|
| ***G06F 21/00*** | (2013.01) |
| ***H04L 9/40*** | (2022.01) |
| ***H04L 12/46*** | (2006.01) |
| ***H04L 45/52*** | (2022.01) |
| ***H04L 67/10*** | (2022.01) |
| ***H04L 69/22*** | (2022.01) |

(52) U.S. Cl.

CPC ...... *H04L 63/0428* (2013.01); *H04L 12/4633* (2013.01); *H04L 45/52* (2013.01); *H04L 63/14* (2013.01); *H04L 67/10* (2013.01); *H04L 69/22* (2013.01); *H04L 2209/42* (2013.01); *H04L 2212/00* (2013.01)

(58) Field of Classification Search

CPC . H04L 63/0428; H04L 12/4633; H04L 45/52; H04L 45/745; H04L 63/14; H04L 67/10; H04L 69/22; H04L 2209/42; H04L 2212/00

See application file for complete search history.

(56) References Cited

U.S. PATENT DOCUMENTS 5,086,469 A * 2/1992 Gupta ........................ H04L 9/40 713/160
7,043,633 B1 5/2006 Fink et al.
7,216,230 B2 5/2007 Suzuki et al.

(Continued)

FOREIGN PATENT DOCUMENTS

WO 2012/048206 A2 4/2012

OTHER PUBLICATIONS

Deering, et al. "RFC 2460—Internet Protocol, Version 6 (IPv6) Specification", (1998) (38 pages).

(Continued)

*Primary Examiner* — Michael M Lee
(74) *Attorney, Agent, or Firm* — Ballard Spahr LLP

(57) ABSTRACT

Methods and systems for implementing a moving target defense are described. The moving target defense can comprise obfuscating a protocol identifier within a packet. The protocol identifier can be replaced with a faux protocol identifier. Additionally, diversion headers can be inserted into to the packet, thereby creating additional layers of complexity.

40 Claims, 22 Drawing Sheets

(56) References Cited

U.S. PATENT DOCUMENTS

| | | | | |
|---|---|---|---|---|
| 7,979,692 | B1 | 7/2011 | Washington et al. | |
| 8,837,729 | B2 | 9/2014 | Nikander et al. | |
| 2006/0173968 | A1* | 8/2006 | Vaarala | H04L 9/0841 709/227 |
| 2007/0104190 | A1* | 5/2007 | Harmjanz | H04L 63/0227 370/465 |
| 2008/0056248 | A1* | 3/2008 | Braudes | H04L 69/22 370/389 |
| 2008/0187137 | A1 | 8/2008 | Nikander et al. | |
| 2010/0153450 | A1 | 6/2010 | Betouin et al. | |
| 2010/0290468 | A1* | 11/2010 | Lynam | H04L 67/14 370/392 |
| 2011/0103394 | A1* | 5/2011 | Vogt | H04L 61/2557 370/401 |
| 2011/0286460 | A1 | 11/2011 | Lynam et al. | |
| 2011/0305160 | A1* | 12/2011 | Green | H04L 43/026 370/252 |
| 2012/0137014 | A1* | 5/2012 | Wang | H04L 69/22 709/230 |
| 2013/0212249 | A1* | 8/2013 | Groat | H04L 61/2525 709/223 |
| 2013/0298227 | A1 | 11/2013 | Smith et al. | |
| 2016/0255054 | A1* | 9/2016 | Wan | H04L 45/74 713/160 |
| 2016/0269284 | A1 | 9/2016 | Cheng et al. | |
| 2017/0366515 | A1 | 12/2017 | Wood | |
| 2018/0367338 | A1 | 12/2018 | Seshadri | |

OTHER PUBLICATIONS

Dunlop et al. "MT6D: A Moving Target IPv6 Defense", Military Communications Conference, (2011)—MILCOM 2011 (7 pages).

Heydari, et al., "Moving Target Defense Enhanced by Mobile IPv6", 7th Annual Southeastern Cyber Security Summit, Huntsville, Alabama, Jun. 3-4, 2015. (7 pages).

Hinden et al. "RFC 4291—IP Version 6 Addressing Architecture", (2006) (1 page)(Abstract).

Narten, et al. "RFC 4861—Neighbor Discovery for IP Version 6 (IPv6)", (2007) (97 pages).

Narten, et al. "RFC 4941—Privacy Extensions for Stateless Address Autoconfiguration in IPv6", (2007)(23 pages).

Thomson et al., "RFC 4862—IPv6 Stateless Address Autoconfiguration", (2007)(30 pages).

U.S. Department of Homeland Security, "Moving Target Defense" [retrieved from: http://www.dhs.gov/science-and-technology/csd-mtd][Retrieved on: Jul. 6, 2018](1 page).

* cited by examiner

FIG. 1
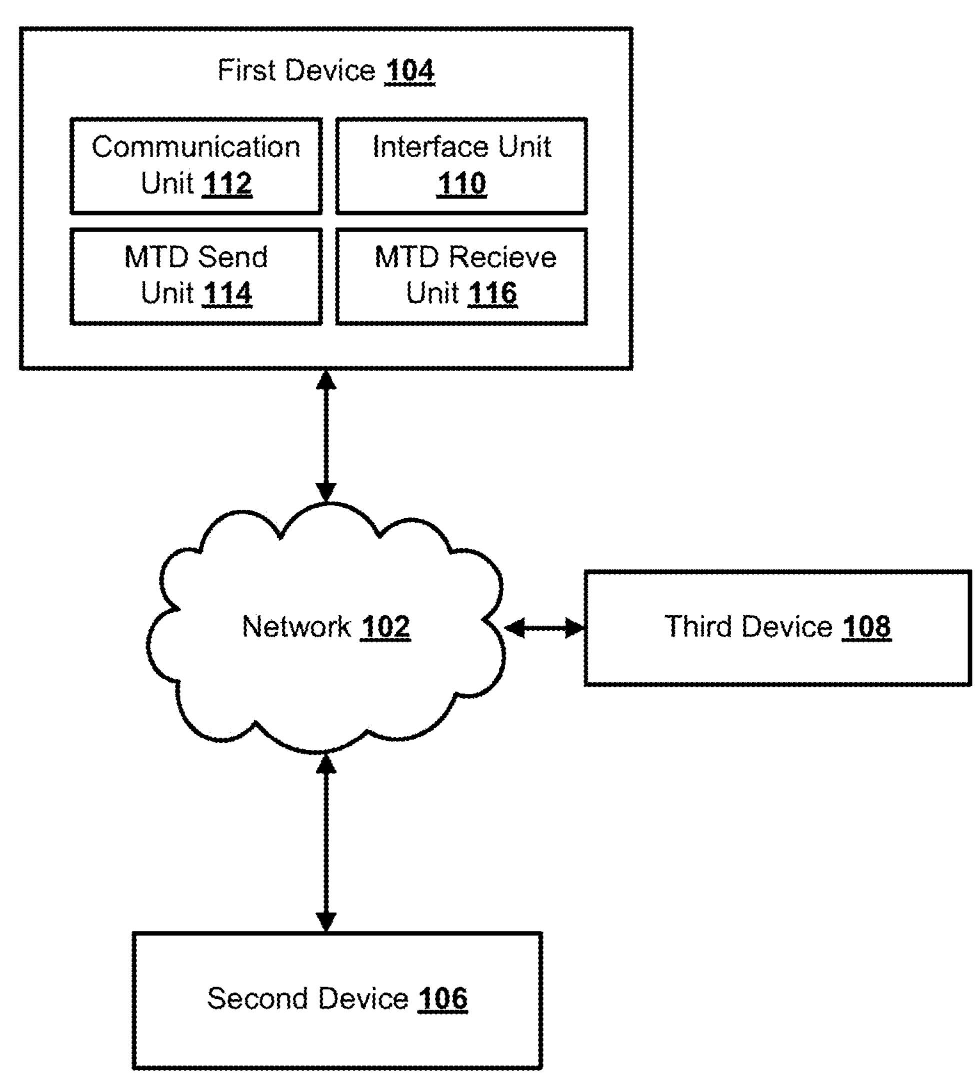

Figure 3:
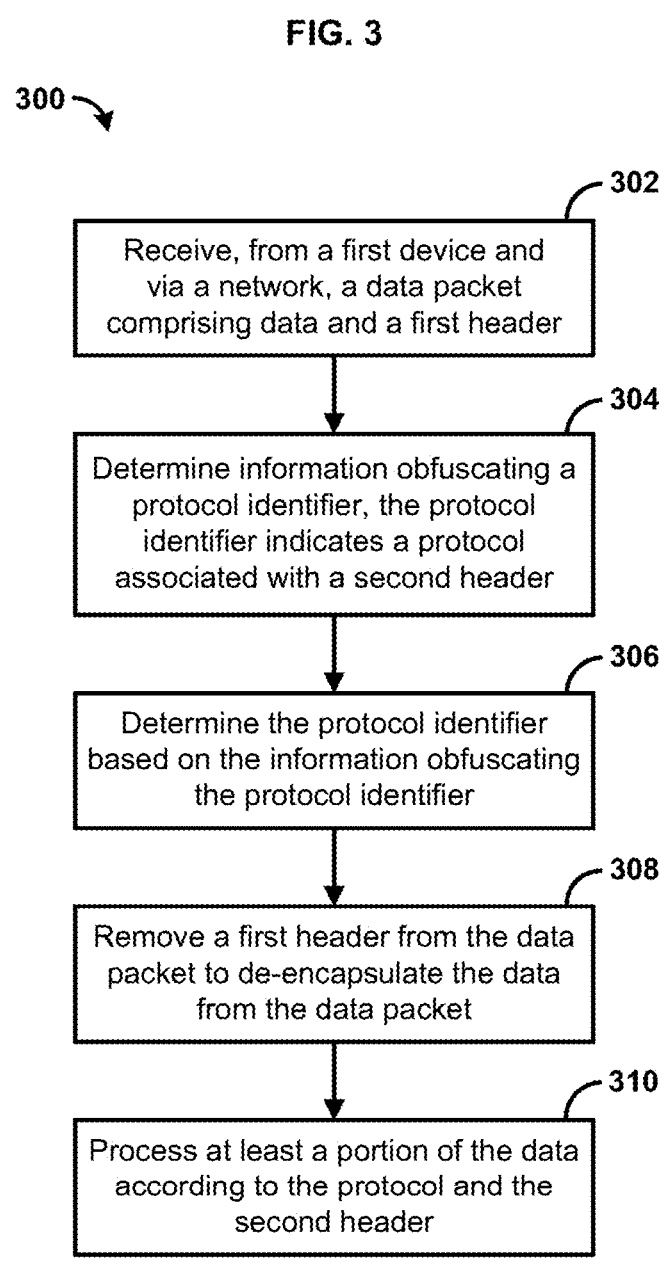

302
Receive, from a first device and via a network, a data packet comprising data and a first header 304
Determine information obfuscating a protocol identifier, the protocol identifier indicates a protocol associated with a second header 306
Determine the protocol identifier based on the information obfuscating the protocol identifier 308
Remove a first header from the data packet to de-encapsulate the data from the data packet 310
Process at least a portion of the data according to the protocol and the second header IPv6 header
Next Header = TCP
TCP header + data IPv6 header
Next Header = Routing
Routing header
Next Header = TCP
TCP header + data IPv6 header
Next Header = Routing
Routing header
Next Header = Fragment
Fragment header
Next Header = TCP
TCP header + data

| IPv6 header<br><br>Next Header = 17 (UDP) | UDP header + data |
|---|---|

| IPv6 header<br><br>Next Header = 43 (Routing) | Routing Extension Header<br><br>Next Header = 44 (Fragment) | Fragmentation Extension Header<br><br>Next Header = 6 (TCP) | TCP header + data |
|---|---|---|---|

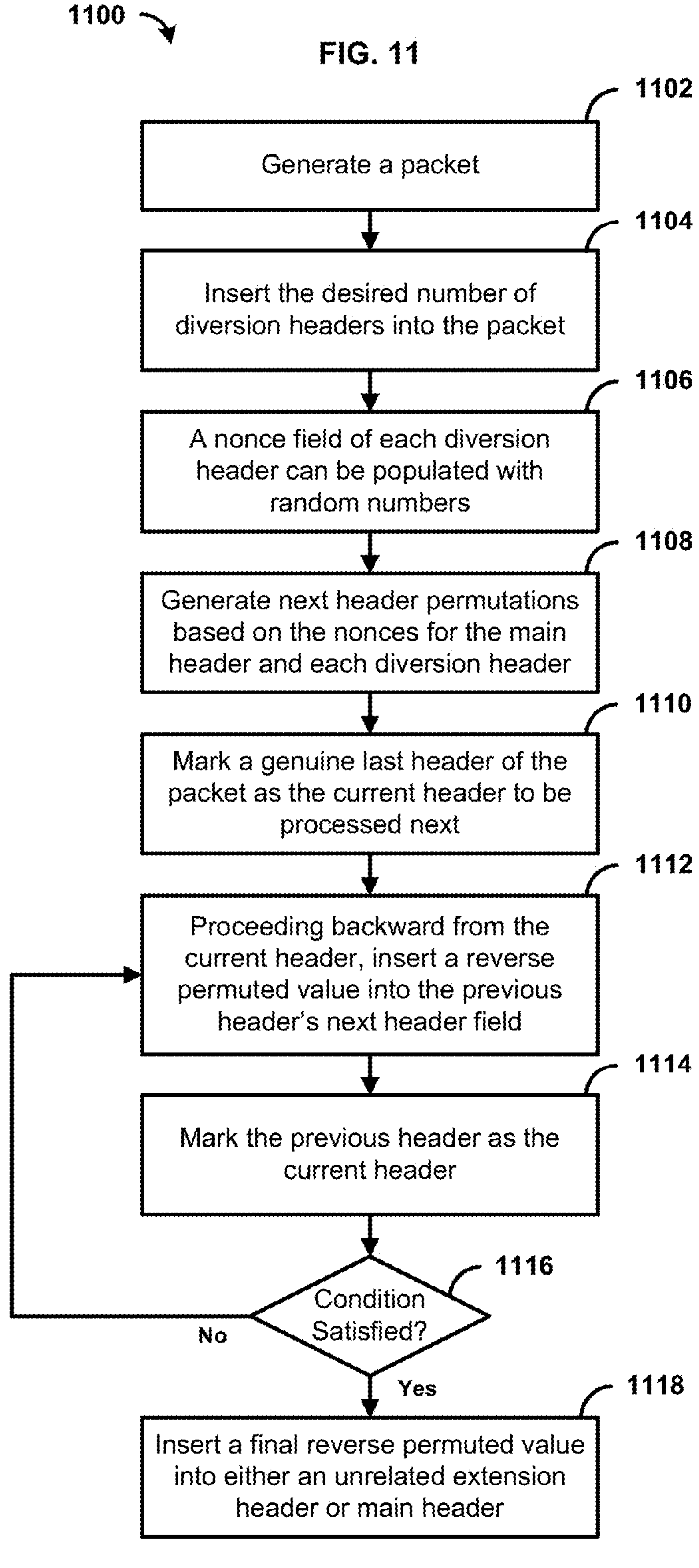
1100
FIG. 11
1102
Generate a packet
1104
Insert the desired number of diversion headers into the packet
1106
A nonce field of each diversion header can be populated with random numbers
1108
Generate next header permutations based on the nonces for the main header and each diversion header
1110
Mark a genuine last header of the packet as the current header to be processed next
1112
Proceeding backward from the current header, insert a reverse permuted value into the previous header's next header field
1114
Mark the previous header as the current header
1116
Condition Satisfied?
No
Yes
1118
Insert a final reverse permuted value into either an unrelated extension header or main header

Figure 12:
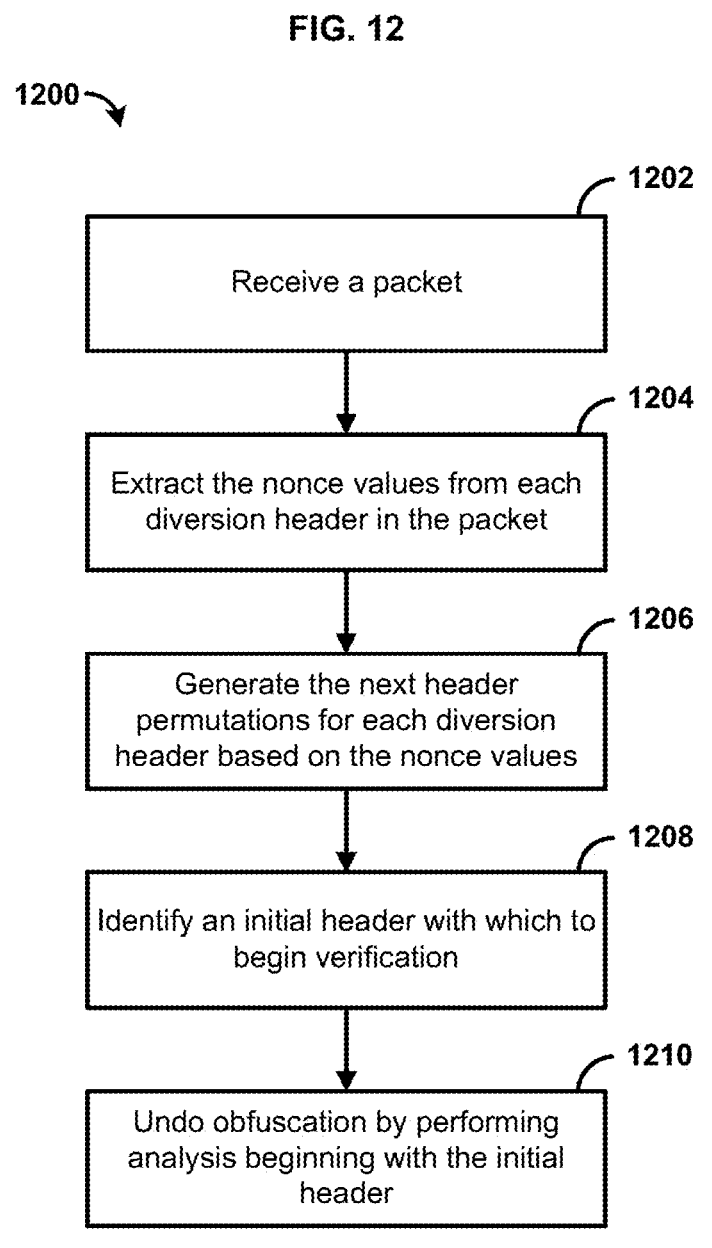

1202 Receive a packet

1204 Extract the nonce values from each diversion header in the packet

1206 Generate the next header permutations for each diversion header based on the nonce values 1208 Identify an initial header with which to begin verification 1210 Undo obfuscation by performing analysis beginning with the initial header

FIG. 14

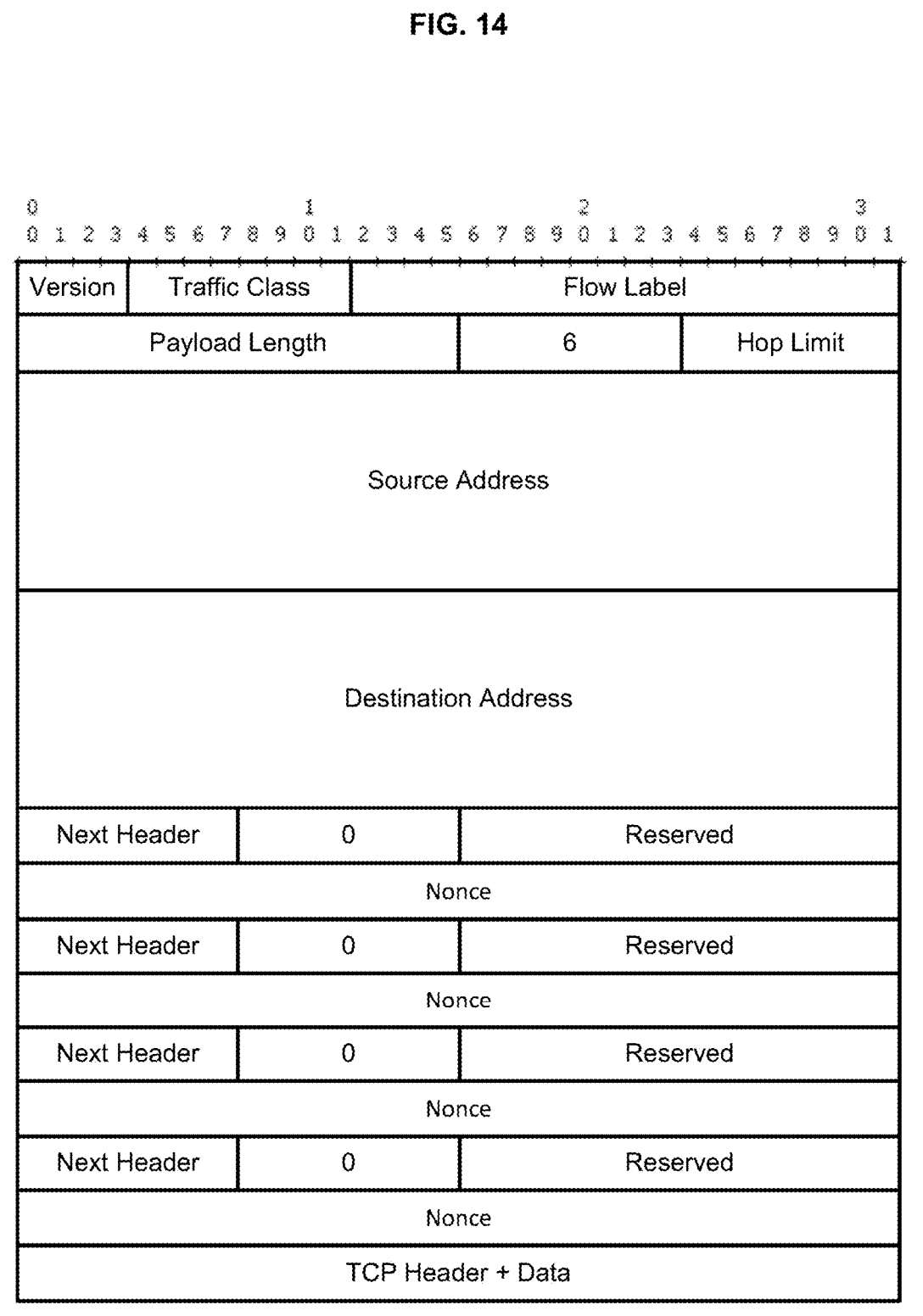

<table>
<tr><td colspan="4">0 1 2 3 4 5 6 7 8 9 0 1 2 3 4 5 6 7 8 9 0 1 2 3 4 5 6 7 8 9 0 1</td></tr>
<tr><td>Version</td><td>Traffic Class</td><td colspan="2">Flow Label</td></tr>
<tr><td colspan="2">Payload Length</td><td>6</td><td>Hop Limit</td></tr>
<tr><td colspan="4">Source Address</td></tr>
<tr><td colspan="4">Destination Address</td></tr>
<tr><td>Next Header</td><td>0</td><td colspan="2">Reserved</td></tr>
<tr><td colspan="4">Nonce</td></tr>
<tr><td>Next Header</td><td>0</td><td colspan="2">Reserved</td></tr>
<tr><td colspan="4">Nonce</td></tr>
<tr><td>Next Header</td><td>0</td><td colspan="2">Reserved</td></tr>
<tr><td colspan="4">Nonce</td></tr>
<tr><td>Next Header</td><td>0</td><td colspan="2">Reserved</td></tr>
<tr><td colspan="4">Nonce</td></tr>
<tr><td colspan="4">TCP Header + Data</td></tr>
</table>

FIG. 15

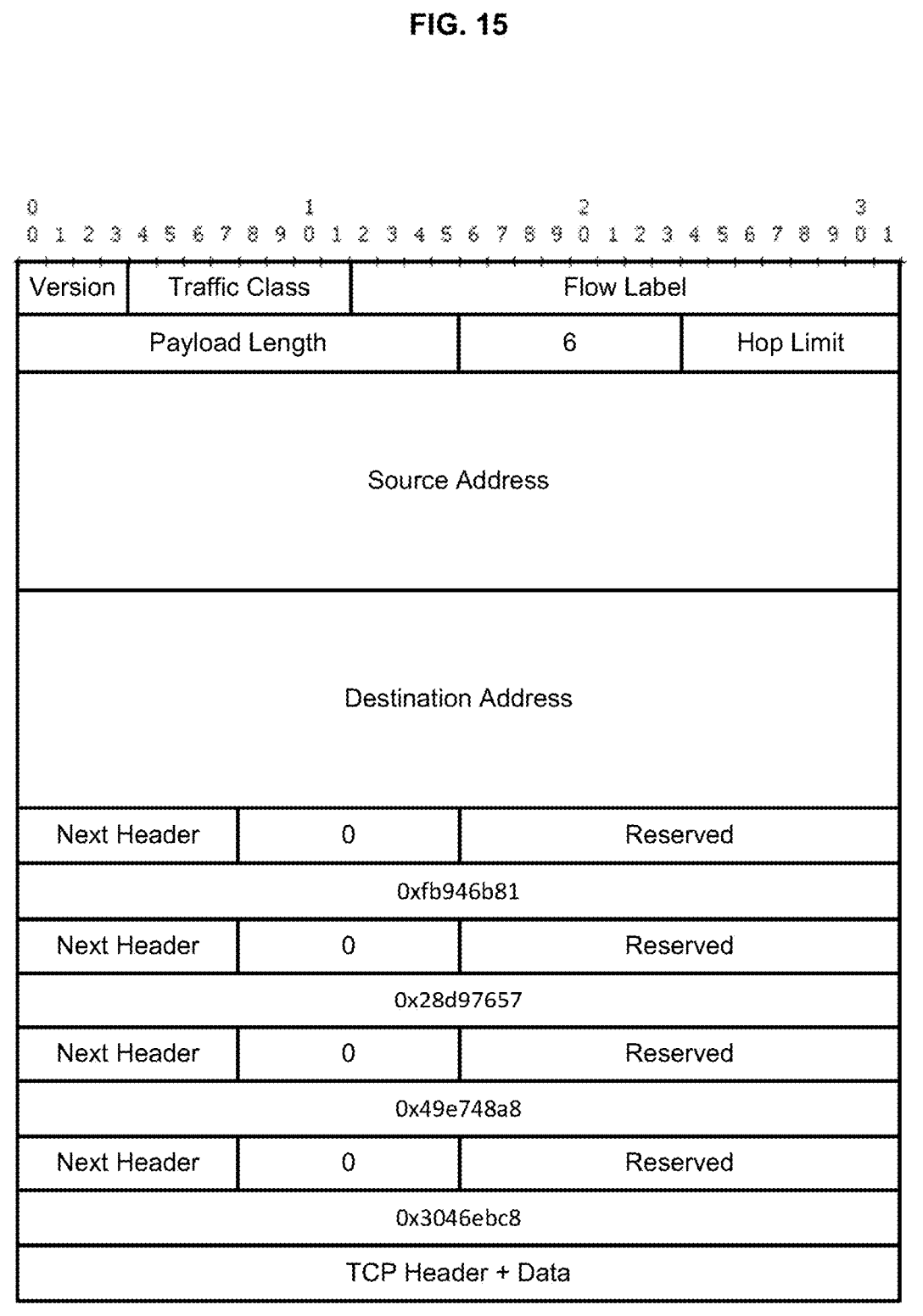

| 0 1 2 3 4 5 6 7 | 8 9 1 0 1 2 3 4 5 | 6 7 8 9 2 0 1 2 3 4 5 6 7 8 9 3 0 1 | | |
|---|---|---|---|---|
| Version | Traffic Class | Flow Label | | |
| Payload Length | | | 6 | Hop Limit |
| Source Address | | | | |
| Destination Address | | | | |
| Next Header | | 0 | Reserved | |
| 0xfb946b81 | | | | |
| Next Header | | 0 | Reserved | |
| 0x28d97657 | | | | |
| Next Header | | 0 | Reserved | |
| 0x49e748a8 | | | | |
| Next Header | | 0 | Reserved | |
| 0x3046ebc8 | | | | |
| TCP Header + Data | | | | |

FIG. 16

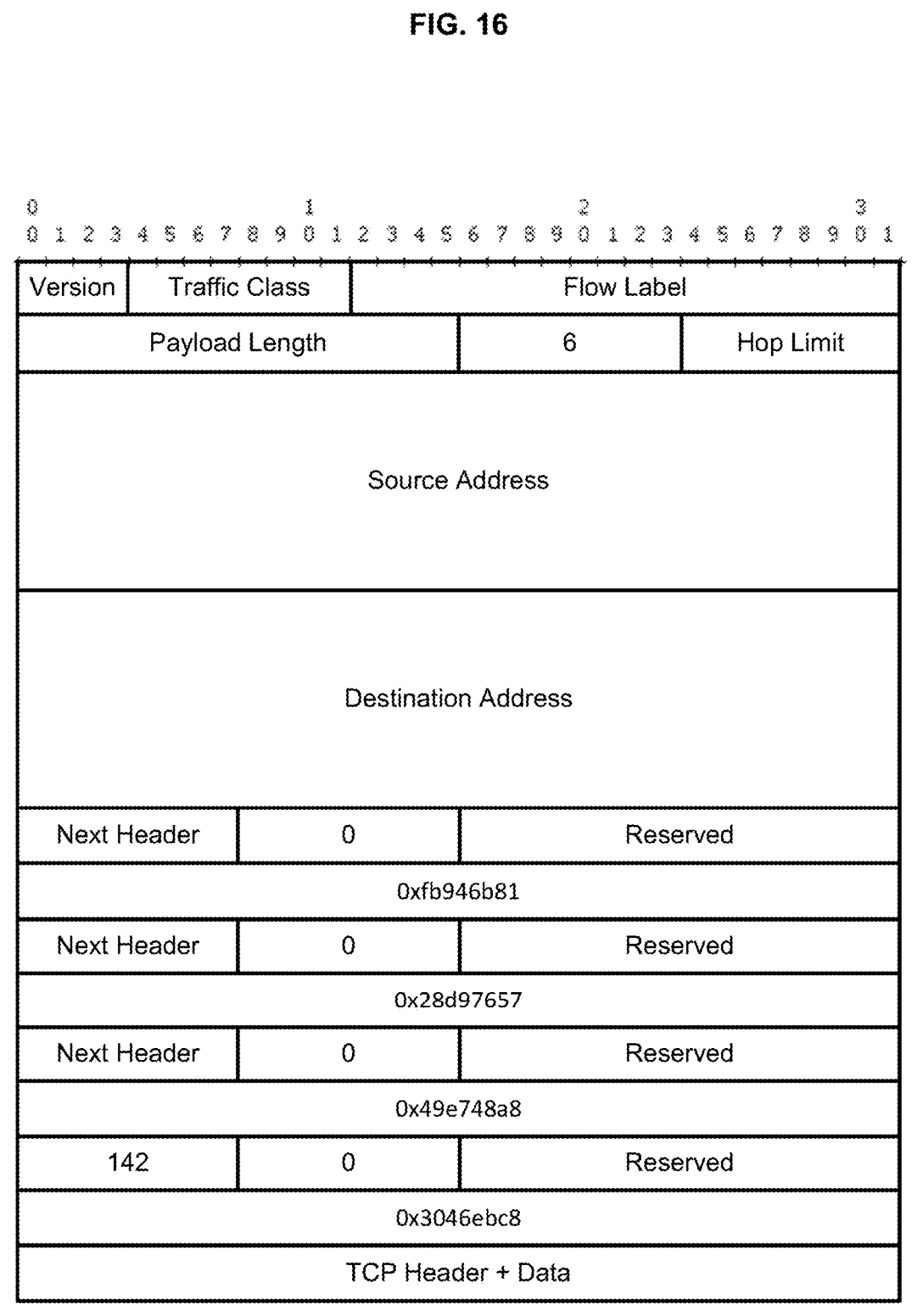

| Bits 0–3 | Bits 4–11 | Bits 12–15 | Bits 16–23 | Bits 24–31 |
|---|---|---|---|---|
| Version | Traffic Class | Flow Label | | |
| Payload Length | | | 6 | Hop Limit |
| Source Address | | | | |
| Destination Address | | | | |
| Next Header | 0 | | Reserved | |
| 0xfb946b81 | | | | |
| Next Header | 0 | | Reserved | |
| 0x28d97657 | | | | |
| Next Header | 0 | | Reserved | |
| 0x49e748a8 | | | | |
| 142 | 0 | | Reserved | |
| 0x3046ebc8 | | | | |
| TCP Header + Data | | | | |

FIG. 17

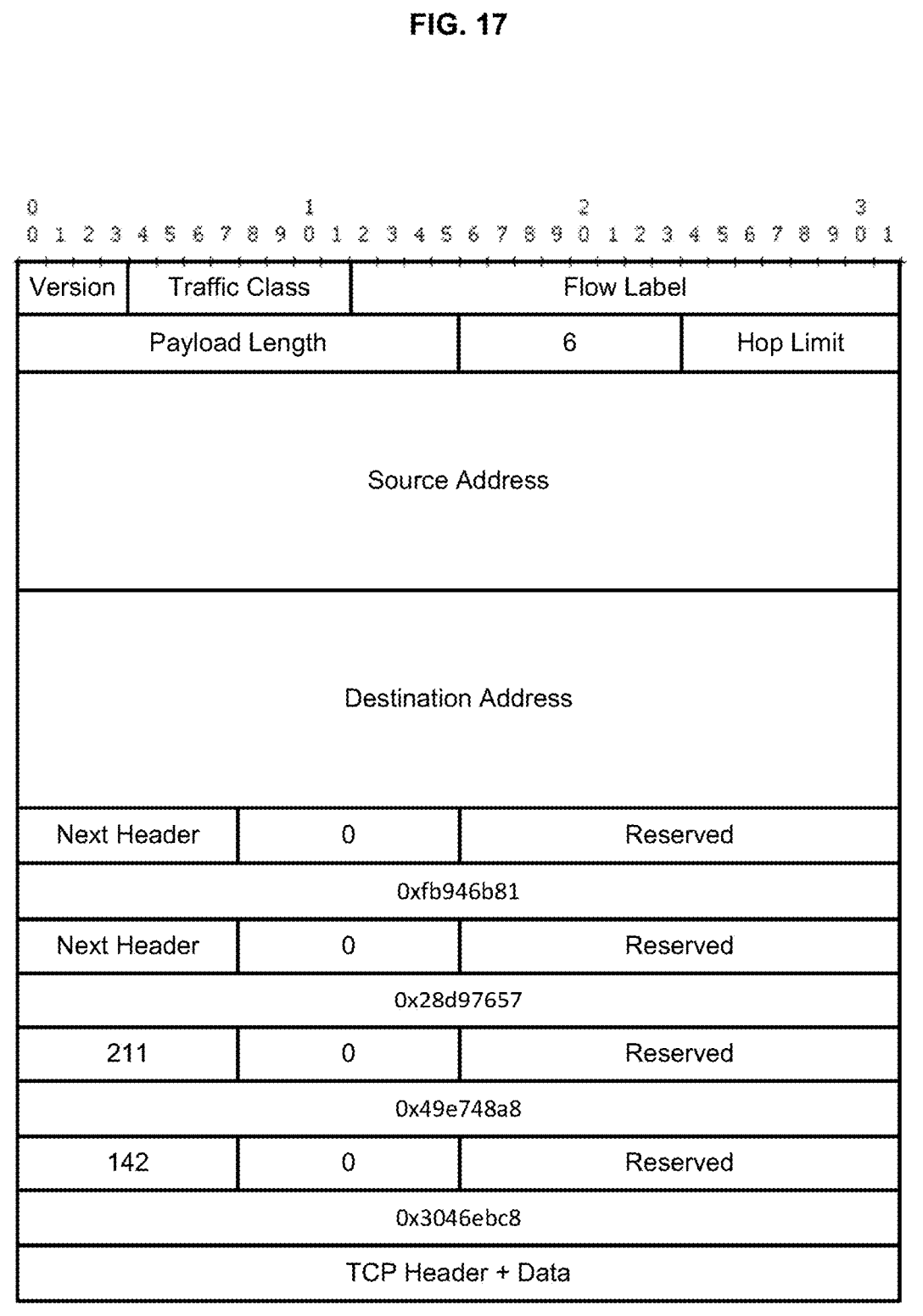

| 0 1 2 3 4 5 6 7 8 9 (bits 0–31) | | | |
|---|---|---|---|
| Version | Traffic Class | Flow Label | |
| Payload Length | | 6 | Hop Limit |
| Source Address | | | |
| Destination Address | | | |
| Next Header | 0 | Reserved | |
| 0xfb946b81 | | | |
| Next Header | 0 | Reserved | |
| 0x28d97657 | | | |
| 211 | 0 | Reserved | |
| 0x49e748a8 | | | |
| 142 | 0 | Reserved | |
| 0x3046ebc8 | | | |
| TCP Header + Data | | | |

FIG. 18

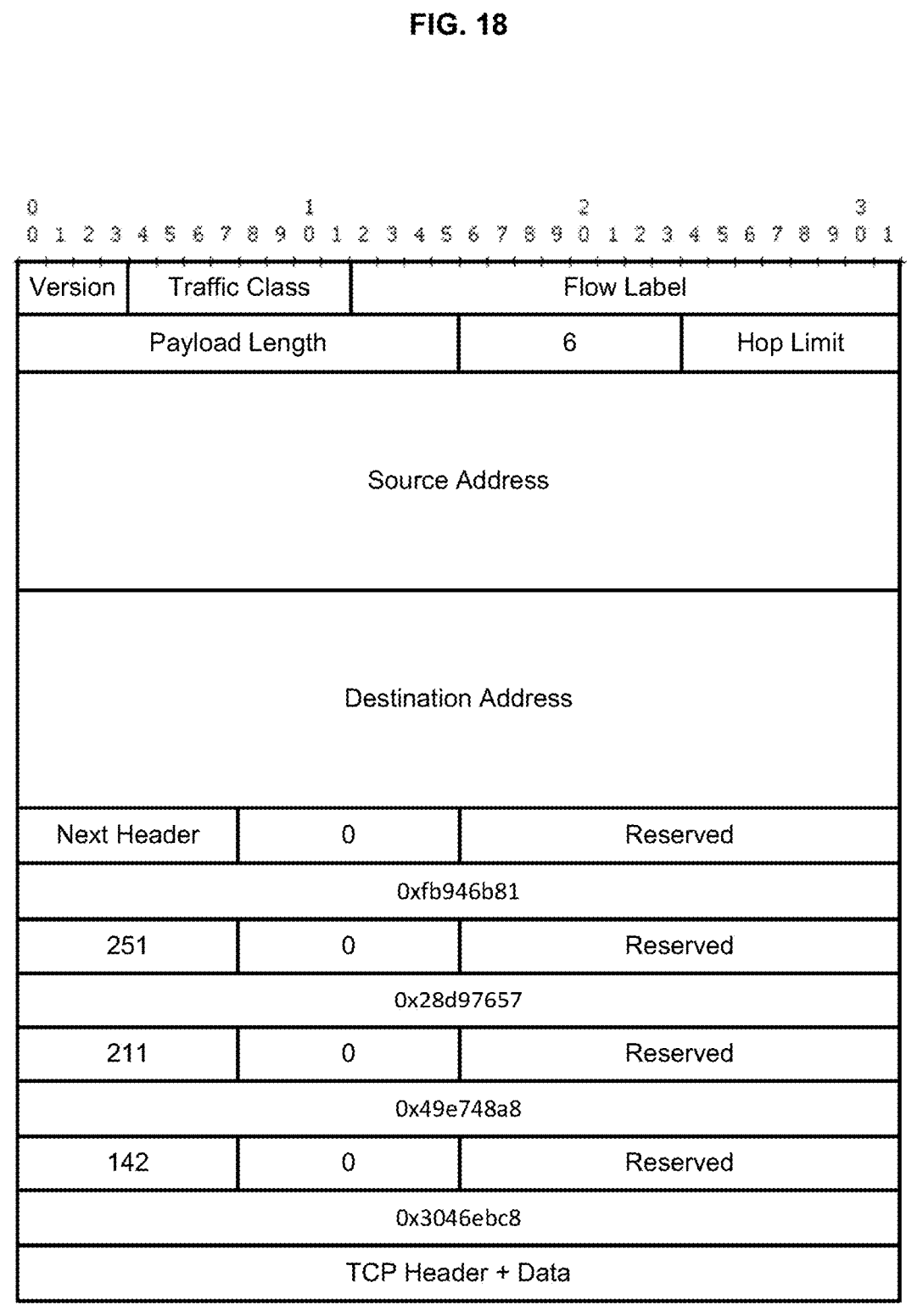

| Bits 0–3 | Bits 4–11 | Bits 12–31 |
|---|---|---|
| Version | Traffic Class | Flow Label |

| Bits 0–15 | Bits 16–23 | Bits 24–31 |
|---|---|---|
| Payload Length | 6 | Hop Limit |

| Bits 0–31 |
|---|
| Source Address |
| Destination Address |

| Bits 0–7 | Bits 8–15 | Bits 16–31 |
|---|---|---|
| Next Header | 0 | Reserved |
| 0xfb946b81 | | |
| 251 | 0 | Reserved |
| 0x28d97657 | | |
| 211 | 0 | Reserved |
| 0x49e748a8 | | |
| 142 | 0 | Reserved |
| 0x3046ebc8 | | |
| TCP Header + Data | | |

FIG. 19

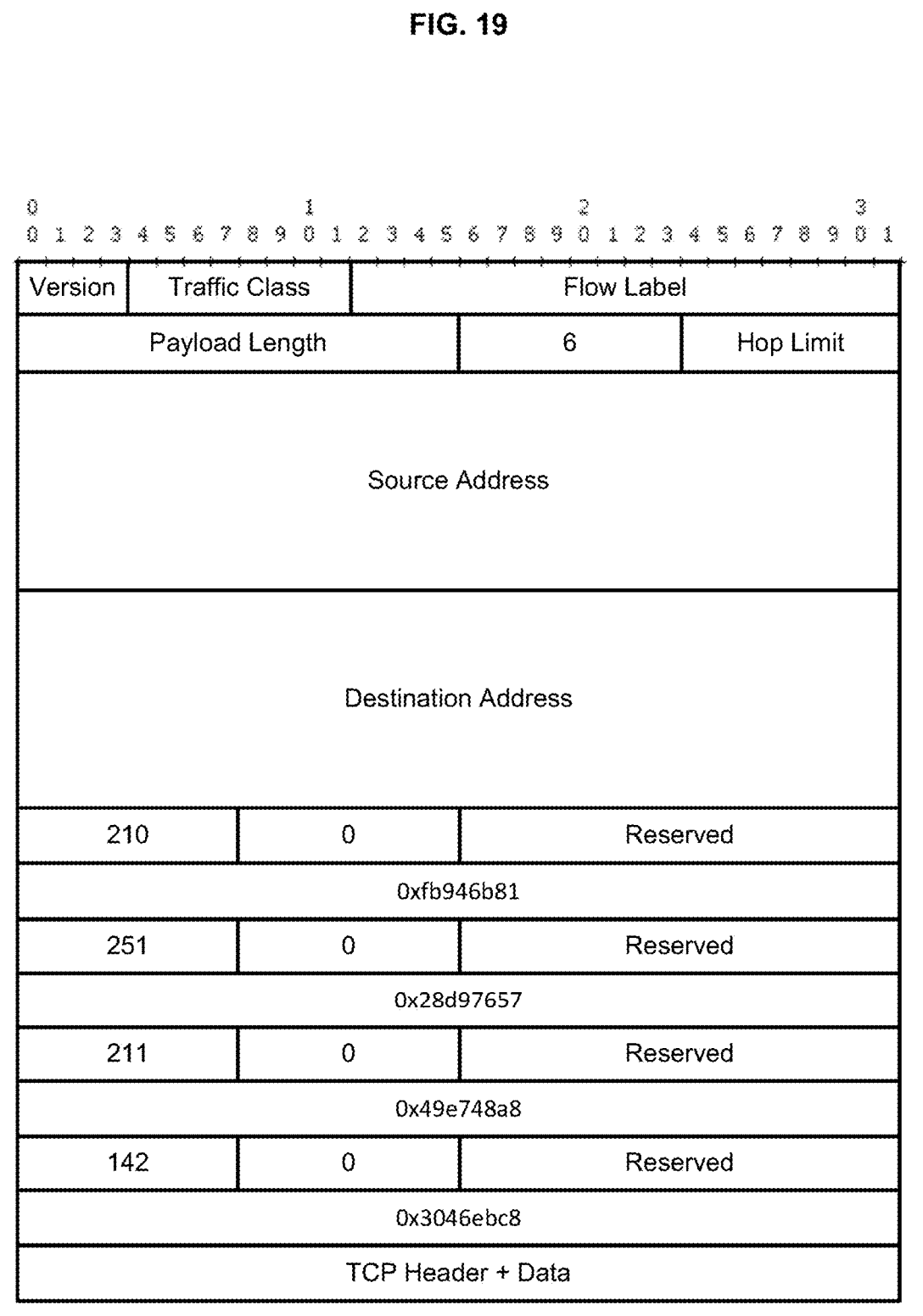

| Version | Traffic Class | Flow Label |
|---|---|---|
| Payload Length | 6 | Hop Limit |
| Source Address | | |
| Destination Address | | |
| 210 | 0 | Reserved |
| 0xfb946b81 | | |
| 251 | 0 | Reserved |
| 0x28d97657 | | |
| 211 | 0 | Reserved |
| 0x49e748a8 | | |
| 142 | 0 | Reserved |
| 0x3046ebc8 | | |
| TCP Header + Data | | |

| | |
|---|---|
| Read the Next Header value contained in the initial header; | 208 |
| Perform a lookup of the permuted Next Header value, using Permutation #1 (there must always be at least one permutation) | Using Permutation 1<br>208 → 210 |
| Verify that the next header is a Diversion Header, and that it contains the expected permuted Next Header value; | Yes<br>NH = 210 |
| If the permuted Next Header value matches {<br>Mark the next Diversion Header the current header;<br>} Else {<br>Discard the packet as invalid;<br>} | Yes<br>DH1 is now current |

FIG. 22

| | |
|---|---|
| Read the Next Header value contained in the current header; | 210 |
| Perform a lookup of the permuted Next Header value, using its corresponding permutation. | Using Permutation 1<br>210 → 251 |
| Verify that the next header is a Diversion Header, and that it contains the expected permuted Next Header value; | Yes<br>NH = 251 |
| If the permuted Next Header value matches {<br>Mark the next Diversion Header the current header;<br>} Else {<br>Discard the packet as invalid;<br>} | Yes<br>DH2 is now current |

FIG. 23

| | |
|---|---|
| Read the Next Header value contained in the current header; | 251 |
| Perform a lookup of the permuted Next Header value, using its corresponding permutation. | Using Permutation 2<br>251 → 211 |
| Verify that the next header is a Diversion Header, and that it contains the expected permuted Next Header value; | Yes<br>NH = 211 |
| If the permuted Next Header value matches {<br>Mark the next Diversion Header the current header;<br>} Else {<br>Discard the packet as invalid;<br>} | Yes<br>DH3 is now current |

FIG. 24

| | |
|---|---|
| Read the Next Header value contained in the current header; | 211 |
| Perform a lookup of the permuted Next Header value, using its corresponding permutation. | Using Permutation 3<br>211 → 142 |
| Verify that the next header is a Diversion Header, and that it contains the expected permuted Next Header value; | Yes<br>NH = 142 |
| If the permuted Next Header value matches {<br>Mark the next Diversion Header the current header;<br>} Else {<br>Discard the packet as invalid;<br>} | Yes<br>DH4 is now current |

FIG. 25

| | |
|---|---|
| Read the Next Header value contained in the last Diversion Header; | 142 |
| Perform a lookup of the permuted Next Header value; | Using Permutation 4<br>142 → 6 |
| Send the remainder of the packet to the protocol stack specified by the permuted Next Header value; | End |

| 0–3 | 4–7 | 8–15 | 16–18 | 19–31 |
|---|---|---|---|---|
| Version | IHL **2606** | Type of Service | Total Length | |
| Identification | | | Flags | Fragment Offset |
| Time to Live | | Protocol **2602** | Header Checksum | |
| Source Address | | | | |
| Destination Address | | | | |
| Options **2604** | | | | Padding |

FIG. 28

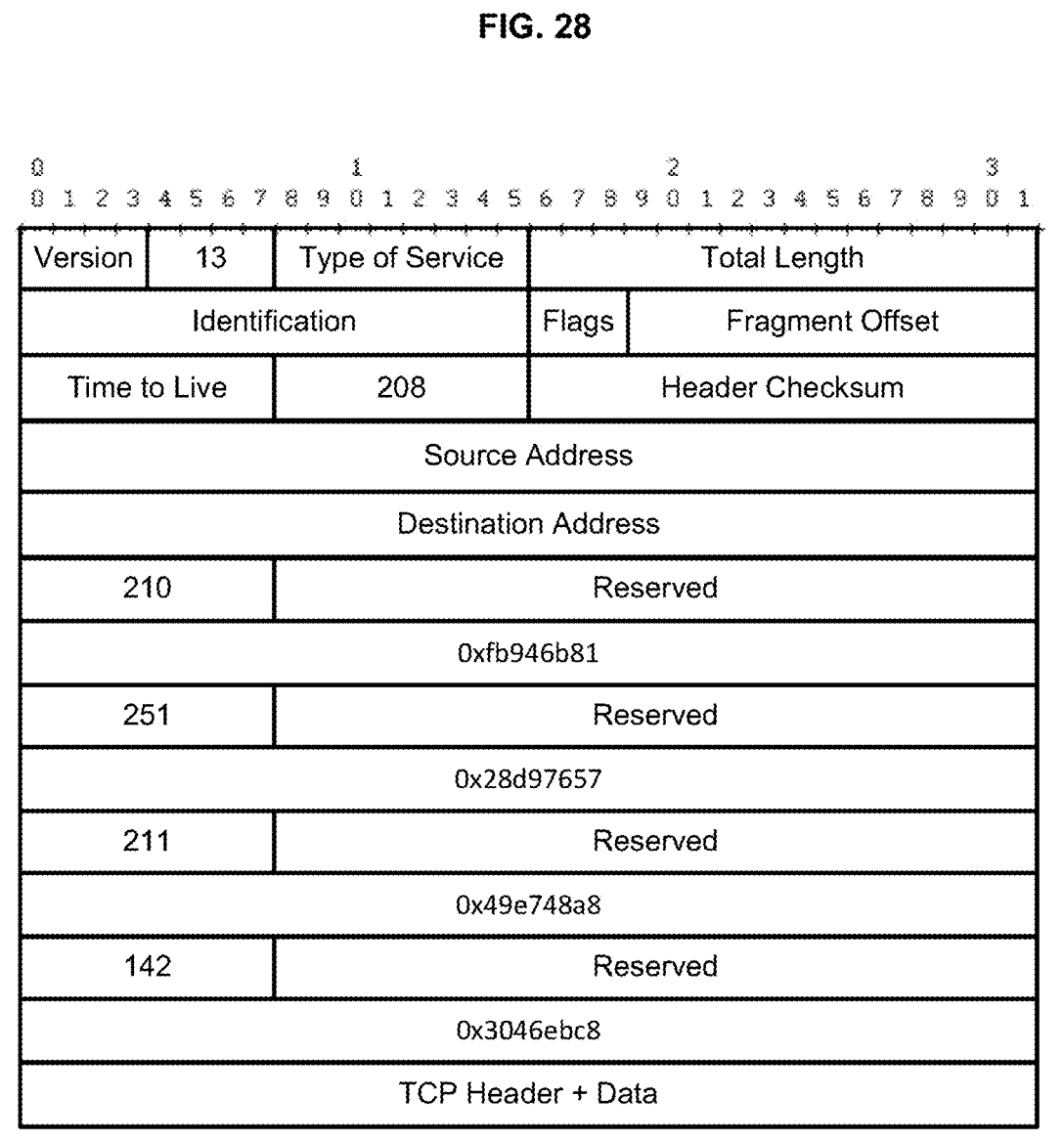

| 0–3 | 4–7 | 8–15 | 16–31 | |
|---|---|---|---|---|
| Version | 13 | Type of Service | Total Length | |
| Identification | | | Flags | Fragment Offset |
| Time to Live | | 208 | Header Checksum | |
| Source Address | | | | |
| Destination Address | | | | |
| 210 | | Reserved | | |
| 0xfb946b81 | | | | |
| 251 | | Reserved | | |
| 0x28d97657 | | | | |
| 211 | | Reserved | | |
| 0x49e748a8 | | | | |
| 142 | | Reserved | | |
| 0x3046ebc8 | | | | |
| TCP Header + Data | | | | |

PROTOCOL OBFUSCATION IN MOVING TARGET DEFENSE

CROSS REFERENCE TO RELATED APPLICATION

This application claims priority under 35 U.S.C. § 120 to, and is a continuation of, U.S. patent application Ser. No. 15/373,163, filed Dec. 8, 2016, the entire contents of which is hereby incorporated herein by reference in its entirety for all purposes.

BACKGROUND

A network typically relies on static, unchanging parameters and protocols to control communication between devices. While this static control allows for different types of devices to communicate, the unchanging nature of the system allows for attackers to easily study and exploit the system. Attackers may be able to intercept communications, provide false communication messages, or otherwise exploit the system. Accordingly, a communications system that utilizes a more dynamic approach to communication parameters is disclosed.

SUMMARY

It is to be understood that both the following general description and the following detailed description are exemplary and explanatory only and are not restrictive. Methods and systems for implementing a moving target defense are disclosed. An example method can comprise receiving data for a transmission to a device. The data can be encapsulated in a packet, such as an IPv4 or IPv6 packet. The packet can comprise a main header (e.g., at the beginning of the packet) that includes protocol information indicating which protocol to use in processing a portion of the data, such as a subsequent header. The protocol information can be obfuscated, thereby preventing the protocol information from being used in a malicious attack.

The protocol information can be obfuscated by replacing the protocol information with faux protocol information and inserting additional headers. The faux protocol information can be determined (e.g., calculated) by using nonce values in the additional headers to generate permutations of available protocol identifiers, which can be mapped to the correct protocol information. The data can then be transmitted across a network. A device receiving the data with the faux protocol information can undo the obfuscation by similarly using the nonce values in the additional headers to recreate the mapping of the permutations of available protocol identifiers to the correct protocol information.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 1 is a block diagram illustrating various aspects of an exemplary system for implementing a moving target defense;

FIG. 2 is a flowchart illustrating an example method for obfuscating protocol information;

FIG. 3 is a flowchart illustrating an example method for determining protocol information;

FIG. 11 is a flowchart illustrating another example method for obfuscating protocol information;

FIG. 12 is a flowchart illustrating an example method for determining protocol information;

FIG. 14 illustrates example insertion of diversion headers into a packet;

FIG. 15 illustrates example insertion of nonce values in the diversion headers;

FIG. 16 illustrates example insertion of a next header value in a diversion header;

FIG. 17 illustrates example insertion of another next header value in a diversion header;

FIG. 18 illustrates example insertion of another next header value in a diversion header;

FIG. 19 illustrates example insertion of another next header value in a diversion header;

FIG. 20 illustrates example insertion of another next header value in a main header;

FIG. 21 illustrates example verification logic as applied to the initial header;

FIG. 22 illustrates example verification logic as applied to a first diversion header;

FIG. 23 illustrates example verification logic as applied to a second diversion header;

FIG. 24 illustrates example verification logic as applied to a third diversion header;

FIG. 25 illustrates example verification logic as applied to a fourth diversion header;

FIG. 28 illustrates an example IPv4 packet with diversion headers; and

DETAILED DESCRIPTION

Figure 4:
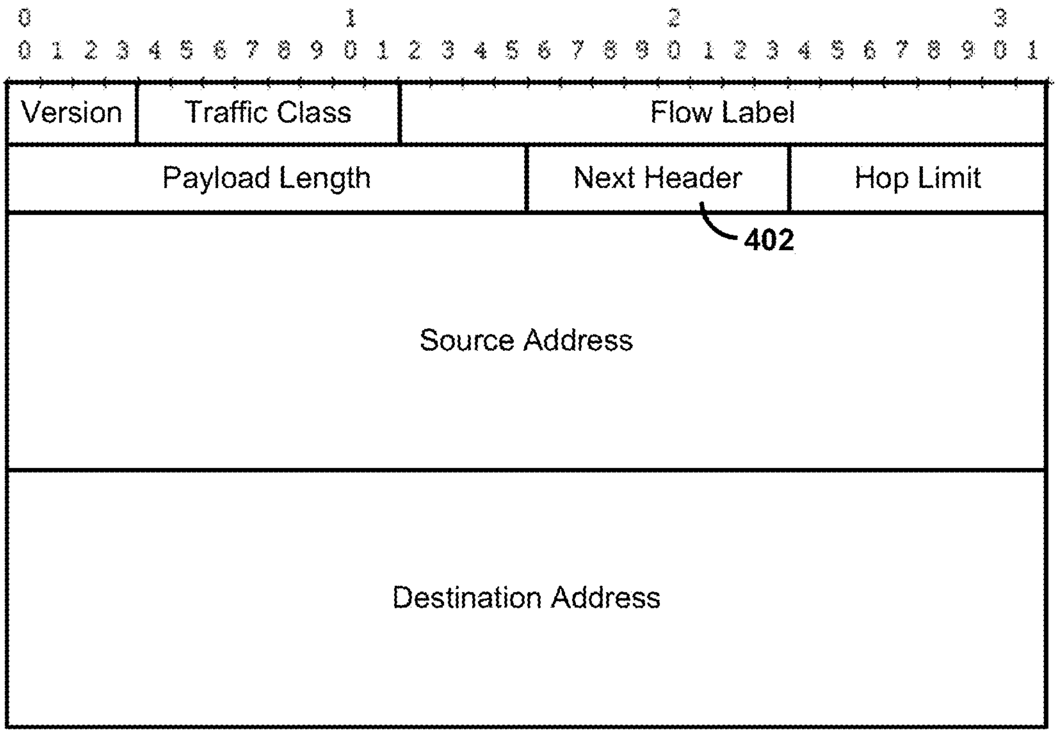
FIG. 4 illustrates an example structure of an IPv6 packet header.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to a moving target defense. Methods and systems are described for implementing the moving target defense. The moving target defense can be implemented by obfuscating (e.g., masking, hiding, transforming, encoding, encrypting, switching, replacing, removing) protocol information in a data packet. The protocol information can comprise a protocol identifier. For example, the protocol information can be stored in a field of a header, such as a next header field (e.g., of an IPv6 packet) or a protocol field (e.g., of an IPv4 packet). The protocol information can comprise a protocol identifier that indicates which protocol to use for processing a subsequent (e.g., in data order, sequence in which data is ordered in a data packet) header and/or subsequent data. The protocol information can be obfuscated by one or more techniques, such as inserting additional "diversion" headers subsequent to a main header (e.g., beginning portion of the data packet) and replacing the protocol information with faux protocol information. The faux protocol information can be determined based on permutations of possible values of the protocol information. The protocol information can be replaced with the faux protocol information in the main header as well as the diversion headers. Permutations of possible values of the protocol information can be determined for each of the diversion headers. The permutations for one header can be mapped to the permutations of a prior and/or subsequent header. Then, faux protocol information can be determined by using the mapping as described in more detail herein.

FIG. 1 is a block diagram illustrating various aspects of an exemplary system 100 in which the present methods and systems can operate. One skilled in the art will appreciate that provided herein is a functional description and that the respective functions can be performed by software, hardware, or a combination of software and hardware.

In one aspect, system 100 can comprise a network 102. In one aspect, the network 102 can comprise a packet switched network (e.g., internet protocol based network), a non-packet switched network (e.g., quadrature amplitude modulation based network), and/or the like. The network 102 can comprise network adapters, switches, routers, modems, and the like connected through wireless links (e.g., radio frequency, satellite) and/or physical links (e.g., fiber optic cable, coaxial cable, Ethernet cable, or a combination thereof). The network 102 can comprise public networks, private networks, wide area networks (e.g., Internet), local area networks, and/or the like. The network 102 can comprise a content access network, content distribution network, and/or the like. In one aspect, the network 102 can be configured to provide communication from telephone, cellular, modem, and/or other electronic devices to and throughout the system 100. For example, the network 102 can be configured to communicatively couple one or more of a first device 104, second device 106, a third device 108, and/or the like.

The first device 104 and the second device 106 can be nodes in the network 102. The first device 104 and the second device 106 can be peers in the network 102. The first device 104 and the second device 106 can each comprise any type of network device, such as a server, a user device, a router, a gateway, a switch, a computer, a mobile device, a smart device, a proxy, a set top box, a digital or analog streaming device, a security device, a sensor node, a television, a tablet device, a laptop device, a navigational device, and/or the like. For example, the first device 104 and the second device 106 can both be servers. As another example, the first device 104 and the second device 106 can both be user devices.

As an illustration, the first device 104 can be a server for communicating with the second device 106. As an example, the first device 104 can communicate with the second device 106 for providing data and/or services. As an example, the first device 104 can provide services such as network (e.g., Internet) connectivity, network printing, media management (e.g., a media server), content services, streaming services, broadband services, or other network-related services. In an aspect, the first device 104 can allow the second device 106 to interact with remote resources such as data, devices, and files. As an example, the first device 104 can be configured as (or disposed at) a central location (e.g., a headend, or processing facility), which can receive content (e.g., data, input programming) from multiple sources. The first device 104 can combine the content from the multiple sources and can distribute the content to user (e.g., subscriber) locations via a distribution system of the network 102. The second device 106 can be a user device. The second device 106 can be configured to provide content, services, information, applications, and/or the like to one or more users. For example, the second device 106 can comprise a computer, a smart device (e.g., a smart phone, a smart watch, smart glasses, smart apparel, a smart accessory), a laptop, a tablet, a set top box, a display device (e.g., television, monitor), a digital streaming device, a proxy, a gateway, a transportation device (e.g., an on board computer, a navigation system, a vehicle media center), a sensor node, and/or the like.

The first device 104 and the second device 106 can each comprise a respective interface unit 110 configured to provide an interface to a user to interact with remote devices. The interface unit 110 can be any interface for presenting and/or receiving information to/from the user, such as user feedback. An example interface can comprise a content viewer, such as a web browser (e.g., Internet Explorer®, Mozilla Firefox®, Google Chrome®, Safari®, or the like), media player, application (e.g., a web application, a mobile application, a media device application), and/or the like. Other software, hardware, and/or interfaces can be used to provide communication between the user and one or more of the second device 106 and the first device 104.

The first device 104 and the second device 106 can comprise a respective communication unit 112. As an example, the communication unit 112 can request or query various files from a local source and/or a remote source. As a further example, the communication unit 112 can transmit and/or receive data to a local or remote device. The communication unit 112 can comprise hardware and/or software to facilitate communication. For example, the communication unit 112 can comprise one or more of a modem, a transceiver (e.g., wireless transceiver), a digital-to-analog converter, am analog-to-digital converter, an encoder, a decoder, a modulator, a demodulator, a tuner (e.g., QAM tuner, QPSK tuner), and/or the like. In one aspect, the communication unit 112 can be configured to allow one or more remote devices (e.g., in a local or remote portion of the network 102) to control operation of the first device 104 and/or the second device 106.

The first device 104 and the second device 106 can be configured for communication using a moving target defense (MTD) strategy. For example, the first device 104 and the second device 106 can be configured to obfuscate information in data transmitted between the first device 104 and the second device 106. The MTD strategy can be implemented to avoid attacks from the third device 108. For example, the third device 108 may attempt to establish unauthorized network connectivity to the first device 104 and/or the second device 106. The MTD strategy can comprise obfuscating (e.g., masking, hiding, transforming, encoding, encrypting, switching, replacing, removing) protocol information, such as a protocol identifier, in data. The data can comprise one or more headers having header fields. The data can also comprise a data payload. Example headers, header fields, and data payloads are described further herein and illustrated in the figures.

The first device 104 and the second device 106 can each comprise a respective MTD send unit 114. The MTD send unit 114 can be configured to obfuscate information for transmission of data. The information can be obfuscated as part of encapsulating the data for transmission over the network 102. The data can be encapsulated by a network layer protocol, such as internet protocol version 4 (IPv4), internet protocol version 6 (IPv6), and/or the like. Obfuscating the protocol information can comprise inserting one or more additional fields in the data, replacing a field with a customized header, replacing the protocol information with faux protocol information, and/or the like. For example, obfuscating the information can comprise obfuscating a protocol identifier, such as a protocol identifier in a header. The protocol identifier can indicate a protocol for processing data following the header.

The MTD send unit 114 can be configured to obfuscate the protocol information in a first header of data. The first header can be in a first portion of the data. The usage of the words "first," "second," "third" and before header, such as in "first header" is not meant to imply any particular order, but is only used for convenience in describing particular headers. The data can comprise a second portion of the data following the first portion of the data (e.g., following the first header). The second portion of the data can be encapsulated by the first header. The second portion of the data can comprise a second header (e.g., which can be a header after, in data order, the first header), the data payload, and/or the like. The second header can comprise an extension field of an IPv6 header.

The first header can comprise a first field. The first field can comprise the protocol information. The protocol information can indicate a protocol for processing the second portion of the data (e.g., the second header). For example, the first field can comprise a next header field of an IPv6 header. As another example, the first field can comprise a protocol field of an IPv4 header.

The MTD send unit 114 can be configured to insert faux protocol information into the data. For example, a faux protocol identifier can be determined based on a protocol identifier. The protocol identifier can be determined from a next header field, an options field, and/or the like. The protocol identifier can be replaced within the data with the faux protocol identifier. For example, the faux protocol identifier can be inserted as a protocol number of a next header field, a protocol field, and/or the like.

The faux protocol identifier can be determined in a variety of ways. The faux protocol identifier can be encrypted, hashed, and/or the like. The faux protocol identifier can be determined based on an association of the faux protocol identifier and the protocol identifier. For example, an association can be formed based on a mapping (e.g., or series of mappings) of one or more protocol identifier values to corresponding faux protocol identifier values. An example mapping can comprise permuting a set of protocol identifier values. Permuting can comprise rearranging (e.g., shuffling) a set of values (e.g., protocol identifier values). The set of protocol identifier values can comprise a set having all possible values for the protocol identifier. The possible values can be limited based on a number of bits available for a field storing the protocol identifier. For example, an 8-bit field can have possible values of between 0 and 255 (e.g., 256 possible values). As a simple illustration, permuting a set of {1, 2, 3} can comprise rearranging the set as any of the following sets: {1,3,2}, {2,1,3}, {2,3,1}, {3,1,2}, or {3,2,1}. Both the first device 104 and the second device 106 can be configured to permute the set of protocol identifier values and undo permutation such that a result of permutation is the same at each device.

Permuting can be based on a shared secret. The shared secret can be shared between the first device 104 and the second device 106. The shared secret can comprise any value of sufficient length and entropy to serve as a useful seed for random number generation. The shared secret can comprise at least 1024 bytes of random or high-quality pseudorandom values. Permuting can also be based on a permutation seed. The permutation seed can be a function of the shared secret. The permutation seed can also be a function of a nonce value. The nonce value can be selected by the first device 104 and inserted within the data as explained further herein. As explained further herein, an example implementation can comprise generating a permutation seed based on the nonce and the shared secret. Then, the permutation can be generated based on the permutation seed.

Obfuscating the protocol identifier can comprise inserting one or more additional headers in the data. For example, a diversion header can be inserted into the data. The diversion header can comprise a customized header or other data segment. The diversion header can be an extension header of an IPv6 packet. The diversion header can be an options field (e.g., or data inserted in place of an options field) of an IPv4 packet. The diversion header can be inserted in front of, before, above (e.g., above as depicted in the figures), and/or the like a packet load. The diversion header can be placed anywhere in the data. The diversion header be inserted between a network layer header (e.g., and any legitimate options or extension headers) and the transport layer header. Using FIG. 7 as an example, the diversion header can be added (e.g., in some implementations, the only place the diversion header can be added) between the IPv6 header and the UDP header. Using FIG. 8 as an example, the diversion header can be added (e.g., in some implementations, the only place the diversion header can be added) between the Fragment header and the TCP header. As described further herein, the diversion header can comprise information, fields, and/or the like. The diversion header can comprise a next header field, a nonce field, a reserved field, and/or the like. The next header field can indicate protocol information (e.g., a protocol identifier or protocol number) for subsequent headers and/or portions of the data). The diversion header can comprise a faux protocol identifier (e.g., in the next header field). The diversion header can also comprise a nonce (e.g., in the nonce field).

Multiple diversion headers can be inserted into the data (e.g., next to each other, one following the other, one immediately before or after the other). For example, the data can comprise a first diversion header and a second diversion header. Information in the first diversion header (e.g., nonce, faux protocol identifier) can be related to the information in a second diversion header (e.g., next, following, prior, and/or subsequent to the first diversion header). The first diversion header can comprise a first faux protocol identifier for the second diversion header. The second diversion header can comprise a second faux protocol identifier for processing subsequent headers (e.g., diversion headers, headers for higher layers in the OSI model), data (e.g., payload data), and/or the like. The second diversion header can comprise a nonce value. The first faux protocol identifier can be based on the nonce value in the second diversion header and a shared secret.

The first diversion header and the second diversion header can in the second portion of the data. For example, the first diversion header can be after the first header. The second diversion header can be after the first diversion header in the data. The first diversion header and the second diversion header can be before the second header in the second portion of the data. The MTD send unit 114 can be configured to insert a third faux protocol identifier in the first header (e.g., in a next header field). The third faux protocol identifier can be determined based on a nonce value in the first diversion header.

As a further explanation, the first faux protocol identifier of the first diversion header can be associated with (e.g., related to, a permutation of) a second faux protocol identifier of the second diversion header. A first nonce of the first diversion header can be used to generate a set of permutated values (e.g., based on a specific obfuscation and/or permutation algorithm shared between the first device 104 and the second device 106). The set of permuted values can provide a mapping of the first faux protocol identifier to the second faux protocol identifier. As a simple example, if the first faux protocol identifier has a value of 2 in the set {1, 2, 3}, the second faux protocol identifier can comprise a corresponding value of 1 if the set permuted based on the first nonce is {3, 1, 2}. The mapping can be based on a position within the set. For example, since the value of 2 is second in the set, the corresponding value can be 1 because the value of 1 is also second in the set permuted based on the first nonce. Similarly, the third faux protocol identifier in the first header can be associated with (e.g., related to, a permutation of) the first faux protocol identifier.

The first device 104 and the second device 106 can each comprise a respective MTD receive unit 116. The MTD receive unit 116 can be configured to remove obfuscation of the data in order to restore the data. The MTD receive unit 116 can be configured to process the obfuscated data to restore the data. Processing the obfuscated data can comprise processing one or more diversion headers. The MTD receive unit 116 can locate the one or more diversion headers within the data. A first diversion header can be determined. A first faux protocol identifier can be determined within the first diversion header. A first nonce value can be determined within the first diversion header. A first permuted set can be determined based on the first nonce (e.g., and the shared secret). The MTD receive unit 116 can check for additional diversion headers. If no additional diversion headers are found then the protocol identifier can be determined. The protocol identifier can be determined based on an association (e.g., mapping) of the first faux protocol identifier with the protocol identifier. For example, the MTD receive unit 116 can determine the protocol identifier by determining a position of the faux protocol identifier with the permuted set. The position can correspond to a value of the protocol identifier. The position can be used to determine the protocol identifier within an unpermuted set.

If additional diversion headers are found by the MTD receive unit 116, then the MTD receive unit 116 can generate permutations (e.g., sets of permuted values) for each additional diversion header using the corresponding nonces within each diversion header. The MTD receive unit 116 can verify that the faux protocol identifiers of each of the diversion headers match the expected value based on generated permutations. If the faux protocol identifiers do not match the expected values, then the received data can be discarded. Example algorithms for performing and removing obfuscation are described in further detail herein.

Figure 2:
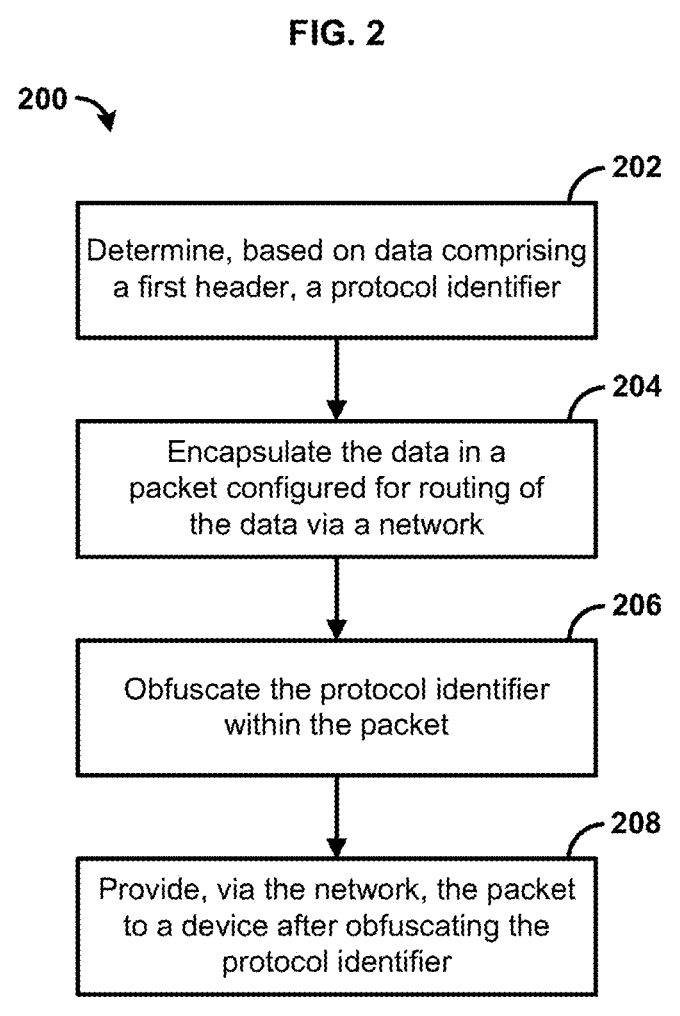

FIG. 2 is a flowchart illustrating an example method 200 for obfuscating protocol information. In an aspect, data comprising a first header can be received. The data can be received at a first device. The data can be received from an application and/or process (e.g., process for preparing the data for transmission) of the first device. The first header can comprise a header for and/or associated with a protocol. The first header can be a protocol not associated with the network layer. The protocol can comprise a transport layer protocol, a link layer protocol, an application layer protocol, a network layer protocol, a combination thereof and/or the like. For example, the first header can comprise a UDP header, a TCP header, and/or the like.

At step 202, a protocol identifier can be determined. The protocol identifier can indicate the protocol associated with the first header. The protocol identifier can comprise a protocol number that identifies the protocol in a field of the packet. For example, the field can comprise a field in a main header (e.g., header at a beginning of the data) of the packet. The main header can comprise a network layer header for routing the data. The field can comprise a next header field (e.g., of an IPv6 header). The field can comprise a protocol field (e.g., of an IPv4 header). The field can specify which protocol to use in processing the next header (e.g., subsequent, next level down), such as the first header. The protocol identifier can be selected from a set of possible protocol identifiers. A number of available protocol identifiers of the set of possible protocol identifiers can depend on the number of bits of the field. If the data does not comprise a main header, the protocol identifier can be determined based on information received from an application or process.

At step 204, the data can be encapsulated in a packet configured for routing of the data via a network. Encapsulating the data in the packet configured for routing of the data via a network can comprise adding a second header based on internet protocol to the data. For example, the second header can comprise the main header (e.g., for an internet protocol based packet). The second header can comprise a source address and a destination address of a network.

At step 206, the protocol identifier can be obfuscated (e.g., masked, hidden, transformed, encoded, encrypted, switched, replaced, removed) within the packet. For example, a faux protocol identifier can be determined based on the protocol identifier. Determining a faux protocol identifier based on the protocol identifier can comprise permuting a set of protocol identifiers based on a shared secret. The set of protocol identifiers can comprise all possible values for the protocol identifiers. Obfuscating the protocol identifier can comprise replacing, within the data, the protocol identifier with the faux protocol identifier. Obfuscating the protocol identifier can comprise inserting the faux protocol identifier as a protocol number of a next header field of the packet.

Obfuscating the protocol identifier can comprise inserting one or more additional headers in the data. The one or more additional headers can be inserted after the second header (e.g., and other headers) associated with routing the data. When referring to positioning of headers, the term "after" means that the bits for a header are ordered, within a data packet, after a prior sequence of data bits (e.g., for a prior header). For example, data can start with a beginning header (e.g., the first bit of a data block), and a subsequent header can be ordered within the data after the beginning header. The term "after" in this context does not necessarily require that the headers be inserted into the data in any particular time order. For example, one header that is after a prior header can be inserted into the data in any time order relative to the prior header. In some implementations, data (e.g., headers) relating to higher levels of the OSI model can be ordered after data relating to lower levels of the OSI model. As a further example, a transport layer header can be after a network layer header. Example data ordering is illustrated throughout the figures, in which data fields (e.g., or data headers) to the right are understood as "after" data fields to the left when in the same row and data fields vertically lower are understood as "after" all data fields vertically higher in the diagram.

The one or more additional headers can comprise a first additional header and a second additional header. The first additional header can comprise a first faux protocol identifier for the second additional header. The second additional header can comprise a second faux protocol identifier for the first header. The second additional header can comprise a nonce value. The first faux protocol identifier can be based on the nonce value and a shared secret.

At step 208, the packet can be provided (e.g., transmitted, sent), via the network, to a second device. The packet can be provided after obfuscating the protocol identifier.

FIG. 3 is a flowchart illustrating an example method 300 for determining protocol information. At step 302, a packet (e.g., data packet) can be received from a first device and via a network. The packet can comprise data (e.g., a data payload). As explained further below, the packet can comprise a first header, a second header, one or more additional headers, and/or the like. For example, the data can comprise, be preceded by, be encapsulated by, and/or the like the second header. The data can be preceded by, be encapsulated by, and/or the like the first header. For example, the first header can be a main header of the packet (e.g., encapsulated and/or preceding both the data and the second header). The first header can define (e.g., specify, format) the packet. The first header can be associated with routing the data. For example, the first header can comprise an internet protocol header. The one or more additional headers, described in more detail herein, can be between the first header and the second header. The second header can comprise a header for and/or associated with a protocol (e.g., a non-network layer protocol). The protocol can comprise a transport layer protocol, an link layer protocol, an application layer protocol, a network layer protocol, a combination thereof and/or the like. For example, the second header can comprise a UDP header, a TCP header, and/or the like.

At step 304, information obfuscating a protocol identifier can be determined within the data. The protocol identifier can indicate a protocol associated with the first header. The information obfuscating the protocol identifier can comprise a faux protocol identifier generated by the first device.

Determining, within the data, information obfuscating the protocol identifier can comprise determining one or more additional headers in the data. The one or more additional headers can be used for protocol obfuscation. For example, the one or more additional headers can be faux or fake headers (e.g., inserted by the first device). The first device can insert the one or more additional headers. The one or more additional headers can be inserted after (e.g., in data order, from beginning of the data to the end of the data) routing headers. For example, the one more additional headers can located after the first header. The one or more additional headers may be inserted before or after (e.g., in order of time) other headers are added to the data, such as the first header or second header. As explained further herein, the one or more additional headers can be any data segment, such as an extension (e.g., extension header), header (e.g., diversion header), field (e.g., (protocol field), or other segment used to provide information for processing of data. The one or more additional headers can comprise a first additional header and a second additional header. The first additional header can comprise a first faux protocol identifier for the second additional header. For example, the first faux protocol identifier indicate information (e.g., which protocol to use) for processing the second additional header. The second additional header can comprise a second faux protocol identifier for the second header. The second faux protocol identifier can indication information (e.g., which protocol to use) for processing the second header. The second additional header can comprise a nonce value. For example, the first faux protocol identifier can be based on the nonce value and a shared secret. As explained further herein, the nonce value can be used for obfuscating and/or de-obfuscating protocol information. For example, the nonce value and/or the shared secret can be used to generate a permutation of protocol identifier, which is used as a faux protocol identifier.

Determining, within the data, information obfuscating the protocol identifier can comprise determining the information from a field specifying which protocol to use for a subsequent (e.g., next level down) header, such as the second header. The information can be determined from a next header field (e.g., of an IPv4 packet), a protocol field (e.g., of an IPv4 packet), and/or the like.

At step 306, the protocol identifier can be determined based on the information obfuscating the protocol identifier. Determining the protocol identifier based on the information obfuscating the protocol identifier can comprise determining the protocol identifier based on the faux protocol identifier. The faux protocol identifier can be correlated with the protocol identifier based on encryption, permutations of values, nonce values, and/or the like. Determining the protocol identifier based on the information can comprise determining a nonce value within the data, generating a permutation of the protocol identifier based on nonce, determining the protocol identifier based on a permutation, a combination thereof, and/or the like.

At step 308, the first header can be removed from the data and/or the second header (e.g., to de-encapsulate the data from the packet). The first header can be removed from the data to allow for processing of the data by one or more protocols, applications, and/or the like. For example, a protocol and/or application can be configured to process the data based on whichever header information appears first in the data. Thus, removing data from the packet (e.g., by removing the first header from the data) can eliminate the need for processing header information when the header is no longer needed for routing. Removing the data from the packet can comprise removing the first header from the data based on internet protocol. For example, the first header can be the main header for an internet protocol (e.g., IPv4, IPv6) based packet. The main header can comprise a source address and a destination address of the network. Since the data has reached the destination address, the main header can be removed (e.g., thereby removing the data from the packet) as the destination address may no longer be needed. The one or more additional headers in the data can also be removed.

At step 310, at least a portion of the data can be processed according to the protocol and the second header. For example, the portion of the data can be sent to a process associated with the protocol, an interface associated with the protocol (e.g., an interface of a protocol stack), and/or the like.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems.

In an aspect, an example communication system can comprise a system configured to implement a Moving Target Defense (MTD) strategy. The example system can be referred to as an MTD system. An MTD strategy can comprise controlling change across one or more system dimensions in order to increase uncertainty and apparent complexity for attackers, reduce attackers window of opportunity, and/or increase the costs of attackers probing and attack efforts.

The MTD system can implement an MTD strategy by using fictitious or faux headers as a moving target defense. For example, in an IPv6 based system a novel header, referred to herein as a diversion header, can be added to data (e.g., a packet), thereby obfuscating protocol information. For example, the MTD system can exploit IPv6's extension header functionality and the "next header" values they rely upon.

Figures 5, 6:
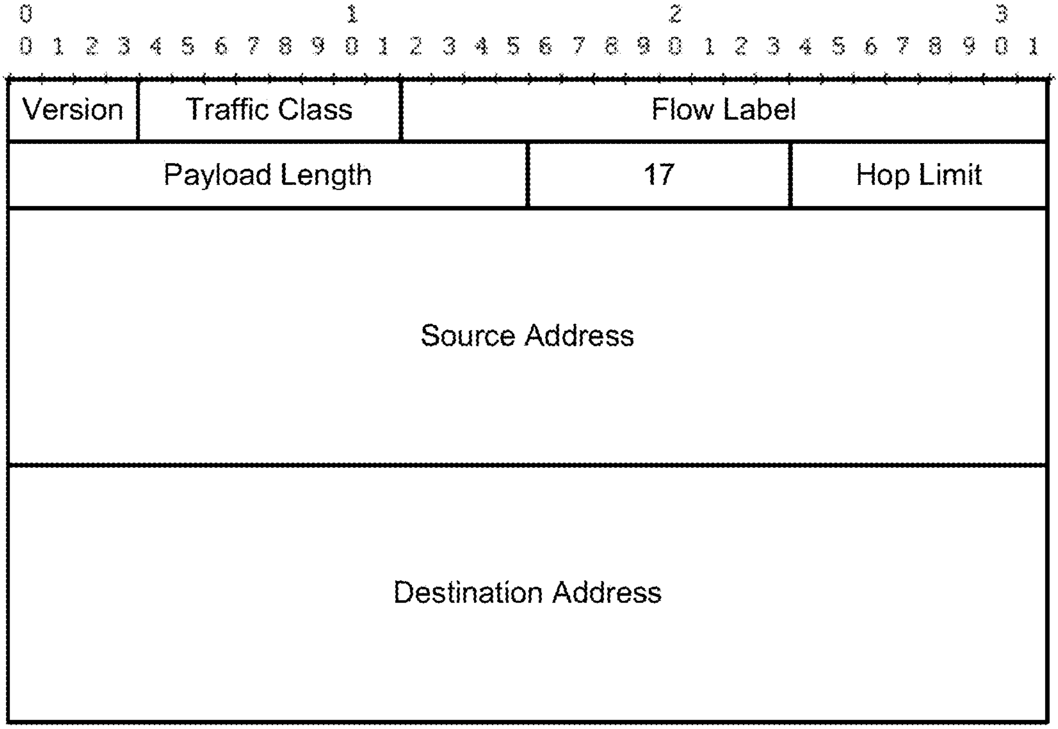
FIG. 5 illustrates example extension headers.
FIG. 6 illustrates an example IPv6 header of a UDP packet.
Figures 7, 8, 9:
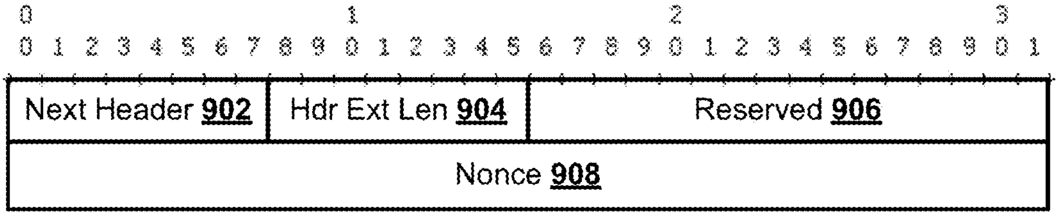
FIG. 7 illustrates an example main IPv6 header with a UDP header.
FIG. 8 illustrates an example main IPv6 header with additional headers.
FIG. 9 illustrates an example diversion header.

FIG. 4 shows an example structure of an IPv6 packet header. The next header field 402 can be used to indicate the next protocol data unit (e.g., protocol header+protocol data) to be found within the packet, after the IPv6 header. The MTD system can also be configured to utilize extension headers. FIG. 5 shows example extension headers. As an illustration, the commonly used UDP protocol, for example, can be assigned a next header value of 17. FIG. 6 illustrates an example IPv6 header of a UDP packet. The next header value indicates to a recipient device that the next protocol header to be found, after the main packet header, will be a UDP header as shown in FIG. 7. Extension headers can also be stacked. For example, FIG. 8 shows the main IPv6 header, followed by a routing extension header (e.g., next header value 43), followed by a fragmentation extension header (e.g., next header value 44), and finally followed by the fragment of the actual transport data, which in this example is TCP data (e.g., next header value 6).

The next header field can comprise a value having 8 bits. The number of bits can determine the number of possible values. For example, an 8-bit field can have possible values of between 0 and 255 (e.g., 256 possible values). Official values for these fields can be standardized or otherwise agreed upon by devices in an MTD system.

The MTD system disclosed herein can increase and dynamically obfuscate the logical distance between potential attackers and the protocol stacks of target systems. This obfuscation can be accomplished by introducing arbitrary levels of diversion headers (e.g., "diversion" extension headers) into valid data packets (e.g., IPv6 packets). Only devices participating in the MTD system and configured with the exact number of levels and/or valid next header permutations can establish connectivity with one another and/or appropriately process data transmitted within the MTD system.

In an aspect, the MTD system can be configured to function with or without other MTD mechanisms, such as address set randomization, instruction set randomization, and data randomization. The MTD system can be configured to implement controlled change. For example, the MTD system can be self-modifying over time. Devices participating in the MTD system can be configured to change in a synchronized manner. For example, the devices can change nonces, encryption settings (e.g., algorithm, key), the number of diversion headers, permutation settings (e.g., algorithm for permuting data sets), and/or any other feature of the present methods and systems as described herein (e.g., or that would otherwise be understood by those of ordinary skill in the art to be implemented as part of the moving target strategy herein).

Device in the MTD system can be configured to quickly detect forged/invalid packets due to the lack of correct diversion headers. If packet with invalid values is detected, the packets can be discarded with no further processing. This configuration will prevent forged packets from reaching their intended target services and reduce the overall burden on the node in denial-of-service scenarios.

For purposes of illustration, the example MTD system can comprise a routable IPv6 network infrastructure. An example system can comprise at least two hosts exist on the network, such as a sender and a receiver. The sender and the receiver can be devices participating in the MTD system that have access to all information (e.g., configuration parameters, shared secrets, etc.) needed to participate in the proposed MTD strategy. Devices participating in the MTD system can use a variety of mechanisms for communication of information used as part of the strategy. For example, an out-of-band communication mechanism can be used that could not be easily eavesdropped by an attacker.

The example MTD system can utilize a novel extension header (e.g., for internet protocols, such as IPv6) referred to herein as a diversion header. This new extension header can be used as a buffer between the main IPv6 header and the destination transport layer used for MTD communications. The diversion headers can be used to generate additional permutations of the next header field (e.g., hence additional complexity to thwart potential attackers).

As an example, the diversion header can be 64 bits (8 octets) long. An example diversion header is shown in FIG. 9. The diversion header can comprise a next header (e.g., 8 bits) field 902. The next header field 902 can identify the type of header immediately following the diversion header. The value of the next header field 902 can represent the obfuscated transport protocol used for communication. The obfuscation can be performed using permutations, as discussed herein. The value of the next header field 902 can also represent another (e.g., subsequent) diversion header. A predefined diversion header chain length (e.g., shared within the MTD system) can configure participating devices to determine whether the value represents an obfuscated transport protocol or another diversion header.

The diversion header can comprise a header extension length field 904. As an example, the header extension length field 904 can comprise 8 bits. The header extension length field 904 can indicate the length of the extension header in 8-octet units, not including the first 8 octets. In some cases, the length can be fixed. A value of 0 can indicate, for example, a fixed length of 64 bits. The diversion header can comprise a reserved field 906. The reserved field 906 can comprise, for example, a value of length 16 bits. The reserved field 906 can be reserved for future use. The diversion header can comprise a nonce field 908. The nonce field 908 can comprise, for example, a value of length 32 bits (e.g., or any other appropriate length). The value of the nonce field 908 can be combined with a shared secret known only to devices in a participating MTD community, so as to uniquely configure the permutation of next header protocol numbers for that community. If a packet contains more than one diversion header, the nonce values for each diversion header can be unique. In an aspect, one or more (or all) devices participating in the MTD system can select, standardize, and/or agree on certain parameters values and modes of operation. Example parameters values and modes of operation are discussed herein.

The MTD system can utilize a fixed number of diversion headers (e.g., within a packet). The fixed number can vary among MTD systems. For example, one MTD system can use a different number than another MTD system (e.g., so long as the devices agree on the number). Each diversion header can be associated with a corresponding diversion header level. The number of diversion header levels can be a fixed value. For example, the fixed value can establish the "protocol distance" between the main IPv6 header and the destination transport layer used for communications in the MTD system.

The MTD system can be configured to implement at least one diversion header level (e.g., to allow for the insertion of at least one diversion header and nonce value, as discussed in the previous section). Additional levels can be used thereby increasing the work factor for potential attackers. As an example, each header level can have 256 possible next header values (e.g., based on an 8-bit next header field) but only one correct value. Specifying 4 header levels, for example, yields $256^4$ or 4,294,967,296 different possible combinations, but only one sequence of next header values is correct. In some implementations, there may be no defined maximum number of header levels. Considerations like protocol stack maturity and network MTU may impose practical upper limits on specific operating system and network platforms.

As previously mentioned, the devices participating in the MTD system can be configured with a shared secret. The shared secret can be a value (e.g., binary value) of sufficient length and entropy to serve as a useful seed for random number generation. For example, the shared secret can comprise at least 1024 bytes of random or high-quality pseudorandom data. The devices participating in the MTD system can be configured with a specific encryption algorithm and mode (e.g., such as AES-256 in CBC mode) to be used in generating and decoding protocol information in diversion headers The devices participating in the MTD system can be configured to calculate next header values (e.g., for diversion headers) based on one or more permutations of available values. A permutation can comprise an arrangement and/or rearrangement of a set of elements (e.g., protocol numbers, protocol identifiers). As a simple illustration, a numeric set of {1,2,3} can be permuted to any of the following sets: {1,3,2}, {2, 1,3}, {2,3,1}, {3,1,2}, or {3,2, 1}. On a per-packet basis, MTD devices can generate a permutation of all possible next header values. The MTD devices can perform the permutation on a per-packet basis. Permutations can be generated for each diversion header of a packet in order to generate faux protocol information. Assuming, for example, that the values of the next header field comprise 256 possible values in a set, as follows: {0, 1, 2, . . . , 255}.

Most permutation or "shuffle" algorithms (e.g., the Fisher-Yates shuffle) are random in nature. For purposes of this MTD system, however, the permutation can be deterministic, such that all devices in a participating MTD system can produce the exact same permutation (e.g., given the same input variables). The permutation can be accomplished by using a predetermined seed for random number generation. The pre-determined seed can be a function of a shared secret known to all participating MTD devices, the nonce(s) contained within the diversion header(s), a combination thereof, and/or the like.

Figure 10:
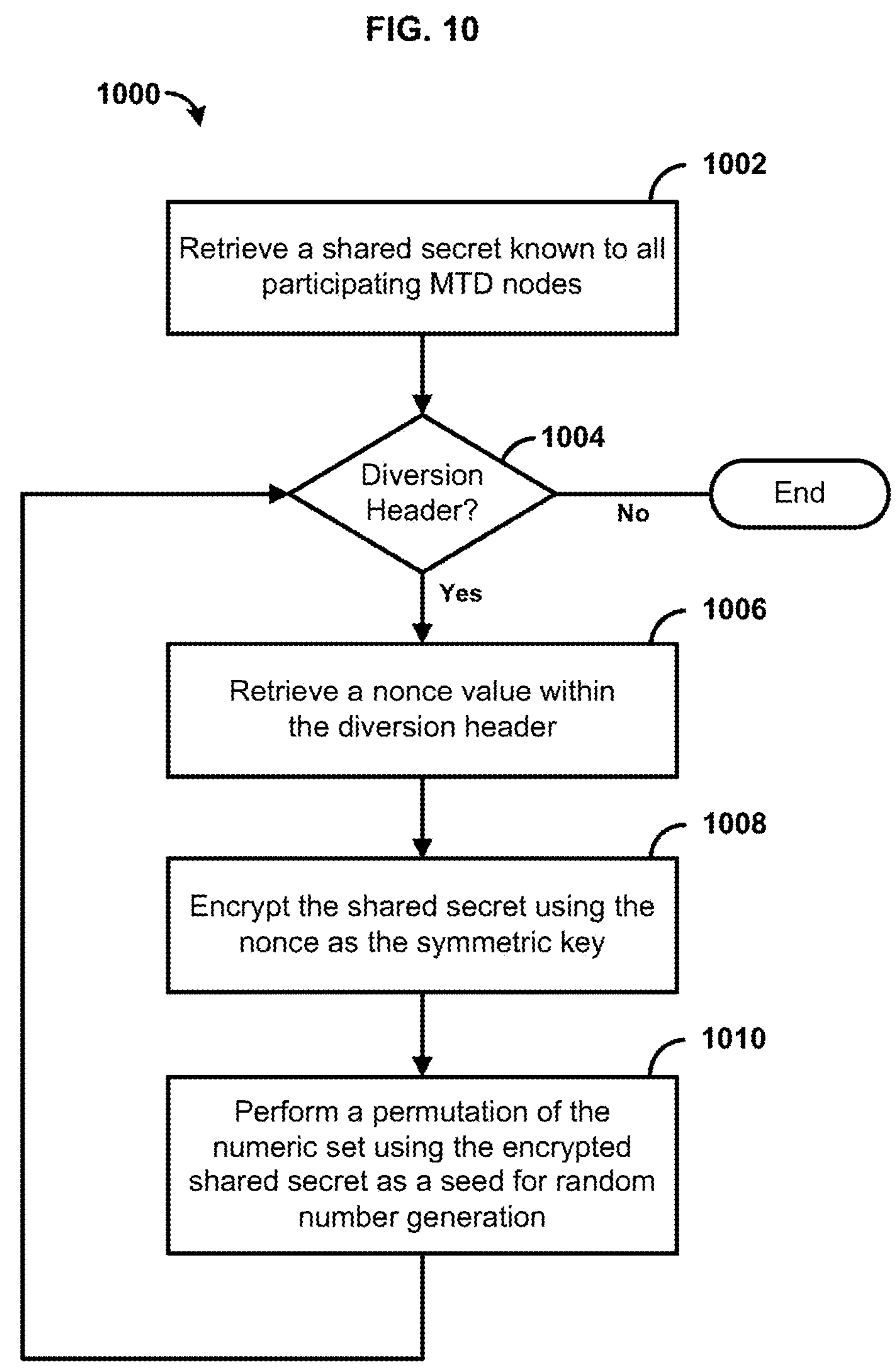
FIG. 10 is a flowchart illustrating an example method for obfuscating protocol information.

In an aspect, the devices participating in the MTD system can be configured to determine permuted next header values (e.g., on a per-packet basis) as shown in FIG. 10. At step 1002, a shared secret known to all participating MTD devices can be retrieved. The shared secret can be a client-specific parameter as described herein. Additional steps can be performed for each diversion header in the packet. The steps can be performed for the first (e.g., first in data order) diversion header proceeding until all diversion headers after the first diversion header are processed.

At step 1004, it can be determined whether the packet has a diversion header that has not yet been processed. If a diversion header remains unprocessed, then the following steps can be performed for the diversion header. At step 1006, the unique nonce contained within the packet's diversion header(s) can be retrieved. At step 1008, the shared secret can be encrypted using the nonce as the symmetric key. It should be noted that the encryption algorithm and mode can be client-specific parameters as described herein. At step 1010, a permutation of the numeric set {0, 1, 2, . . . , 255} can be performed using the encrypted shared secret as the seed for random number generation. Following step 1010, the calculation can return to step 1004 to determine whether the steps are to be repeated for further diversion headers. The result of the calculation can be one or more permuted sets of numbers (e.g., unique to a specific IPv6 packet and each of its diversion headers). These permuted sets can subsequently be used to obfuscate genuine next header values.

In an aspect, devices participating in the MTD system can perform the method shown in FIG. 11 when sending a packet (e.g., IPv6 packet) to other devices participating in the MTD system. At step 1102, a packet (e.g., IPv6 packet) can be generated. For example, one or more headers, such as internet protocol headers (e.g., and any applicable extension headers), can be added to data. At step 1104, diversion headers can be inserted into the packet. The number of diversion headers can be a pre-defined number, an agreed-upon number, and/or the like. The number can be specified by configuration parameters of the MTD system. The diversion headers can be inserted after the main network layer header (e.g., IPv6 header). The diversion header can be inserted after any other extension headers that may be present. For example, consider the illustration of chained extension headers shown in FIG. 8. Diversion headers can be inserted between the Fragment header and TCP header.

At step 1106, the nonce field of each diversion header can be populated with random numbers (e.g., random 32 bit values) generated for each diversion header. At step 1108, the next header permutations can be generated. For example, a corresponding permutation can be generated for each diversion header. A permutation can also be generated for a main packet header (e.g., main IPv6 header). The next header permutations can be generated based on the nonces. The next header permutations can also be generated based on other preconfigured parameters.

At step 1110, a genuine last header (e.g., the packet's genuine transport header and PDU) can be marked as the current header to be processed next. At step 1112, proceeding backward from the current header, a reverse permuted value can be inserted into the previous header's next header field. Reverse permutation (e.g., or inversion permutation) refers to identifying a specific rearranged value in a set (e.g., an image value) and subsequently identifying the ordered value (e.g., the original value) to which it is mapped. For example, if an ordered set comprises {1,2,3,4,5} and a permutation comprises {2,5,1,3,4}, the "reverse permuted value" of rearranged value 5 would correspond to original ordered value 2.

At step 1114, the previous header can be marked the current header. At step 1116, a determination can be made as to whether a condition is satisfied. The condition can comprise reaching an extension header (e.g., a header unrelated to the MTD strategy, an extension header that is not a diversion header). The condition can comprise reaching the main header (e.g., header at the beginning of the data, main IPv6 header). If the condition is not satisfied, steps 1112, 1114 and 1116 can be repeated for the next diversion header. If the condition is met, then step 1118 can be performed.

At step 1118, a final reverse permuted value can be inserted into a header. The final reverse permuted value can be inserted in an extension header and/or the main header (e.g., IPv6 main header). The last permutation can be reused to insert the final reverse permuted value into a header.

FIG. 12 illustrates an example method for undoing obfuscation. MTD devices can perform the following when receiving a packet from other devices in a MTD system. At step 1202, a packet (e.g., IPv6 packet) can be received. At step 1204, the nonce values can be extracted from each diversion header (e.g., if diversion headers are present). For example, the nonce values can be extracted from nonce fields in the diversion headers. At step 1206, the next header permutations can be generated for the packet and each diversion header. The next header permutations can be generated based on the nonce values. The next header permutations can be generated based on preconfigured parameters. At step 1208, an initial header can be identified. The initial header can be the header with which to begin verification. The initial header can comprise the last (e.g., in data order) extension header that is not a diversion header (e.g., the last IPv6 extension header that is not a diversion header). The initial header can comprise the main header (e.g., IPv6 main header).

At step 1210, obfuscation can be undone by performing analysis beginning with the initial header. For example, working forward (e.g., from first available headers to subsequent headers in data order) from the current header, one or more steps of following example logic can be applied:

```
For the initial header {
  Read the Next Header value contained in the initial header;
  Perform a lookup of the permuted Next Header value, using Permuta-
tion
  #1 (e.g., permutation for first Diversion Header)
  Verify that the next header is a Diversion Header, and that it contains
    the expected permuted Next Header value;
  If the permuted Next Header value matches {
    Mark the next Diversion Header the current header;
  } Else {
    Discard the packet as invalid;
  }
}
For each subsequent Diversion Header {
  Read the Next Header value contained in the current header;
  Perform a lookup of the permuted Next Header value, using its
  corresponding permutation.
  Verify that the next header is a Diversion Header, and that it contains
    the expected permuted Next Header value;
  If the permuted Next Header value matches {
    Mark the next Diversion Header the current header;
  } Else {
    Discard the packet as invalid;
  }
}
At the last Diversion Header {
  Read the Next Header value contained in the last Diversion Header;
  Perform a lookup of the permuted Next Header value;
  Send the remainder of the packet to the protocol stack specified by the
    permuted Next Header value;
}
```

The following section gives an example of the approach explained herein, using example data to illustrate intended operation. In this example, the number of diversion header levels selected is 4 (four). In this example, the shared secret is 1024 bytes of random data. For brevity, the random data is not shown. The random data can be any random data appropriate for design constraints. In this example, the encryption algorithm is AES-256 and the mode is CBC.

Figure 13:
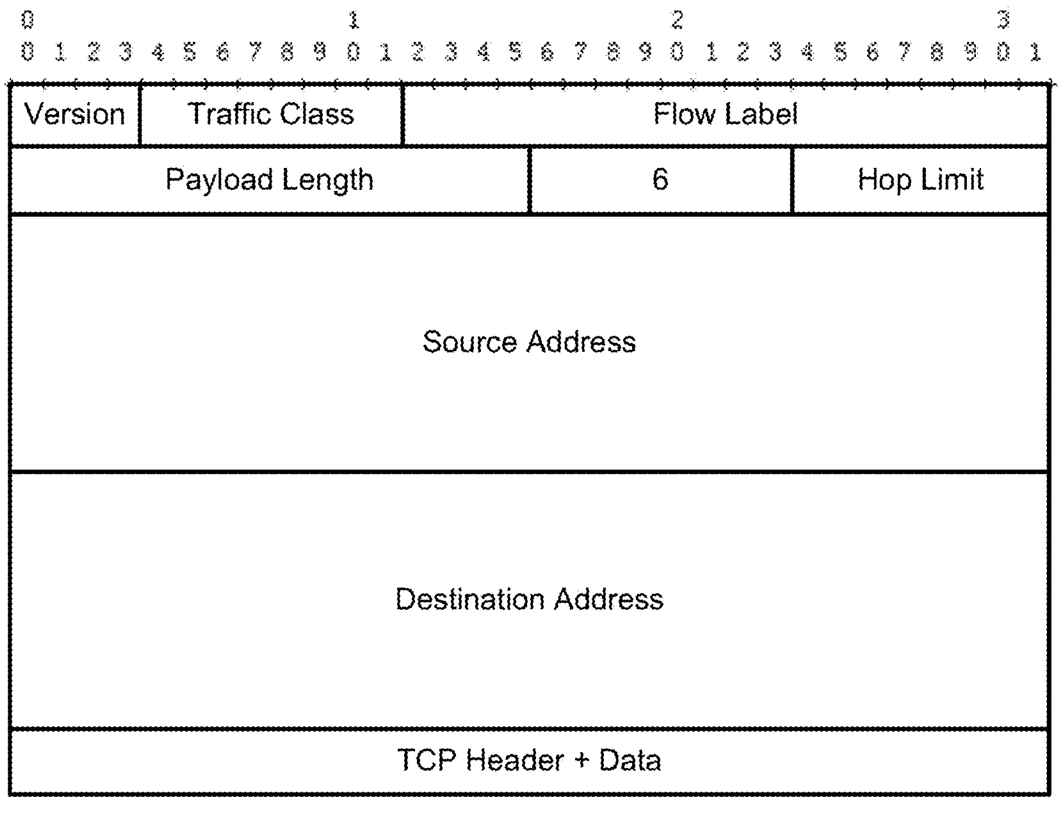
FIG. 13 illustrates an example IPv6 packet with a TCP header and data.

MTD devices can perform the following when sending an IPv6 packet to other devices in a given MTD community. An IPv6 packet can be generated as normal, as shown in FIG. 13. In this example, a simple IPv6 packet is generated with a TCP protocol data unit (e.g., next header value of 6). A specified number of diversion headers can be inserted into the packet, as shown in FIG. 14. In this example, the specified number of diversion header levels is 4. Random 32-bit values can be generated for each diversion header. These random values can be used to populate the "nonce" field of each diversion header, as shown in FIG. 15. In this example, the nonce values are as follows: Nonce #1 is 0xfb946b81, Nonce #2 is 0x28d97657, Nonce #3 is 0x49e748a8, and Nonce #4 is 0x3046ebc8.

Using the nonces and preconfigured parameters, next header permutations can be generated for the main IPv6 header and each diversion header. Recall that the shared secret can be encrypted using each of the nonces as symmetric encryption keys. The resulting values can be used as seeds for permuting the numeric set {0, 1, 2, . . . , 255}. Using its corresponding nonce, one permutation can be generated for each diversion header. Encryption of the shared secret with the nonce can be accomplished using a common encryption utility, such as OpenSSL. For example, the command used can be as follows: "openssl enc -v -aes-256-cbc -nosalt -kfile nonce-in sharedsecret -out permutationseed." The example nonce, shared secret and encrypted output are represented in the command shown by operating system file names (e.g., "nonce," "sharedsecret" and "permutationseed" respectively).

Permuting the numeric set {0, 1, 2, . . . , 255} (e.g., using the encrypted shared secrets as random seeds) can also be accomplished using a common open source utility, such as shuf. An example command used is as follows: "shuf --random-source ./permutationseed -i 0-255|nl -v 0>sample-permutation-enc.txt." The example permutation seed and resultant permutation are represented in the command by operating system file names (e.g., "permutation-seed" and "sample-permutation-enc.txt" respectively). The resulting permutation effectively serves as a 2-column lookup table, as shown in Table 1.

TABLE 1

| Original Value | (Example) Permuted Value |
|---|---|
| 0 | 83 |
| 1 | 98 |
| 2 | 110 |
| 3 | 119 |
| . . . | . . . |
| 253 | 78 |
| 254 | 7 |
| 255 | 46 |

For verification of a MTD packet, permutations can be mapped from the left column of Table 1 to the right column. For example, 0 permutes to 83, 1 permutes to 98, 253 permutes to 78 and so forth. For generation of a MTD packet, permutations can be mapped from the right column of Table 1 to the left column, effectively in reverse. For example, 7 permutes to 254, 78 permutes to 253, 119 permutes to 3, and so forth. For brevity, the permutations used in this example have been are not shown in detail.

A genuine last header (e.g., the packet's genuine transport header and PDU) can be marked as the "current header" to be processed next. Working backward from the current header, the reverse permuted value can be inserted into the previous header's next header field, as shown in FIG. 16. In this example, the current header is the genuine transport header, which is TCP (e.g., numeric value 6). The previous header is diversion header #4. The Permutation to use is permutation #4 (the permutation associated with diversion header #4). For example, 6 reverse permutes to 142.

Figure 20:
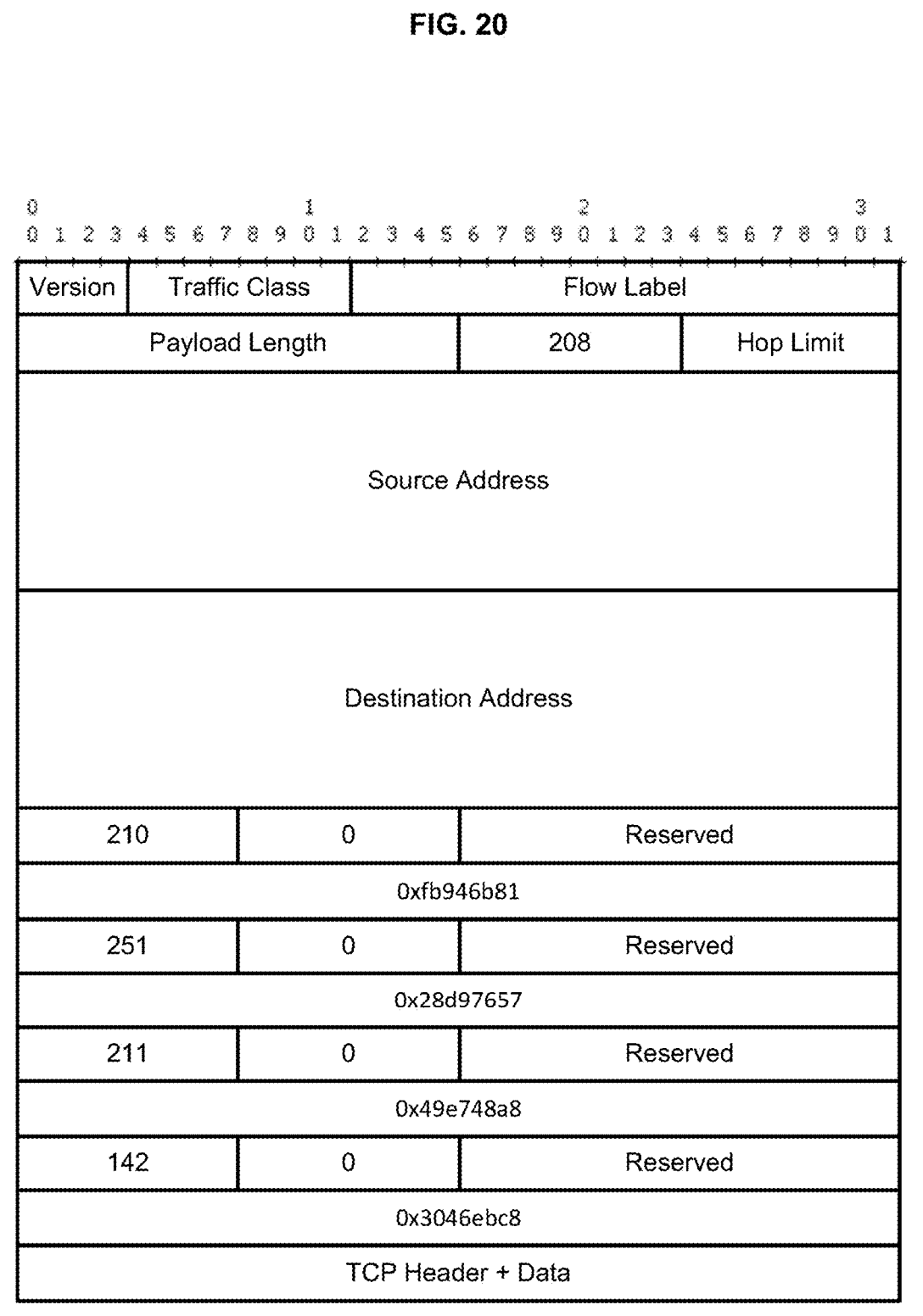

The previous header can be marked as the current header. In this example, diversion header #4 is now the current header. Replacement of the value in the next header field can be repeated for each diversion header until a condition is met. The condition can comprise reaching an IPv6 extension header that is not a diversion head or reaching the main IPv6 header. FIG. 17 shows the result of the next or second iteration. The current header is diversion header #4. The previous header is diversion header #3. The permutation to use is permutation #3 (e.g., the permutation associated with diversion header #3). For example, 142 reverse permutes to 211. FIG. 18 shows the result of a third iteration. The current header is diversion header #3. The previous header is diversion header #2. The permutation to use is permutation #2 (e.g., the permutation associated with diversion header #2). For example, 211 reverse permutes to 251. FIG. 19 shows the result of a fourth iteration. The current header is diversion header #2. The previous header is diversion header #1. The permutation to use is permutation #1 (e.g., the permutation associated with diversion header #1). For example, 251 reverse permutes to 210. The last permutation can be reused to insert a final reverse permuted value into either the unrelated extension header or the main IPv6 header, as shown in FIG. 20. The current header is diversion header #1. The permutation to use is permutation #1. For example, 210 reverse permutes to 208.

By way of further explanation, the packet described above, as shown in FIG. 20, is received and the obfuscation is reversed or undone. MTD devices can perform the following when receiving an IPv6 packet from other devices in the MTD system. First, an IPv6 packet can be received as normal. If diversion headers are present, the nonce value can be extracted from each of diversion header. Using the nonces and preconfigured parameters, next header permutations can be generated for the packet. A verification process can be performed. The verification process can begin by identifying the header with which to begin verification (to be called the "current header") which can be either the last IPv6 extension header that is not a diversion header or the main IPv6 header. Working forward from the current header, example verification logic as described herein (e.g., the verification logic of step 1210 of FIG. 12) can be performed as shown in FIG. 21 through FIG. 25. In FIG. 21 through FIG. 25, steps performed are indicated in the left column and the corresponding results of those steps are indicated in the right column.

FIG. 21 illustrates example verification logic as applied to the initial header. A next header value of 208 can be determined from the initial header. Using permutation #1, the value 210 can be determined based on the 208 value. Diversion header #1 can then be marked as the current header. FIG. 22 illustrates example verification logic as applied to diversion Header #1. A next header value of 210 can be determined from the current header. Using permutation #1, the value 251 can be determined based on the 210 value. Diversion header #2 can then be marked as the current header.

FIG. 23 illustrates example verification logic as applied to diversion header #2. A next header value of 251 can be determined from the current header. Using permutation #2, the value 211 can be determined based on the 251 value. Diversion header #3 can then be marked as the current header. FIG. 24 illustrates example verification logic as applied to diversion header #3. A next header value of 211 can be determined from the current header. Using permutation #3, the value 142 can be determined based on the 211 value. Diversion header #4 can then be marked as the current header. FIG. 25 illustrates example verification logic as applied to the last diversion header (e.g., diversion header #4). A next header value of 141 can be determined from the current header. Using permutation #4, the value 6 can be determined based on the 142 value. The packet is then processed based on the protocol identified by the value 6.

Figures 26, 27:
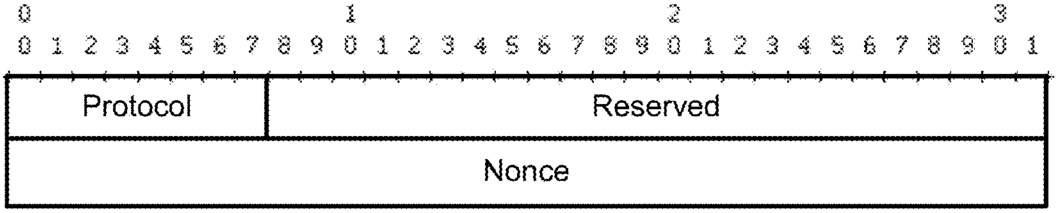
FIG. 26 illustrates an example IPv4 packet header.
FIG. 27 illustrates an example diversion header for use with IPv4.

FIG. 26 through FIG. 28 illustrate an example implementation of the present methods and systems using IPv4. FIG. 26 illustrates an example IPv4 packet header. An IPv4 header can comprise a protocol field (e.g., and associated values) 2602. An IPv4 header can also comprise an options field 2604. An MTD system can be implemented by inserting faux protocol values in the protocol field 2602 as well as inserting diversion headers in the options field 2604. As with IPv6, the protocol field 2602 is an 8-bit value with 256 possible combinations. As such, the permutation strategy described herein can also be used in a similar manner with IPv4 headers. Modifying any of the existing IPv4 header fields could impact routing and delivery of IPv4 packets. One or more IPv4 options field 2604 can be used communicate nonces and other data from MTD sender to MTD recipient.

Unlike IPv6, IPv4 does not have a highly structured framework for packet header options. Instead, options are supported as follows. The second field in the IPv4 packet is the Internet Header Length ("IHL") 2606, which can define the number of 32-bit words in the entire header. The minimum value of the IHL field can be 5, which can indicate a basic packet with no options. A value higher than 5 can indicate the presence of header options. 15 can be the maximum value. Header options can be padded on 32-bit word boundaries. The value of the IHL field can be based on the number of diversion headers used.

With IPv4, the protocol field 2602 is analogous to a next header field (e.g., of IPv6). As such, an example diversion header for use with IPv4 is shown in FIG. 27. The maximum defined length of IPv4 options (e.g., 40 bytes) can, in some implementations, limit the number of possible layers of diversion layers that can be used. For example, 5 layers of diversion header can use 40 bytes of space (e.g., 5 layers×8 bytes per Diversion Header=40 bytes) and therefore may represent the maximum upper limit for diversion headers with IPv4.

FIG. 28 illustrates an example IPv4 packet with diversion headers implementing an MTD strategy. The example uses the same configuration parameters and values (e.g., nonces, shared secrets, permutations, etc.) as described for the examples above. In this example, the IHL can have value of 13.

Figure 29:
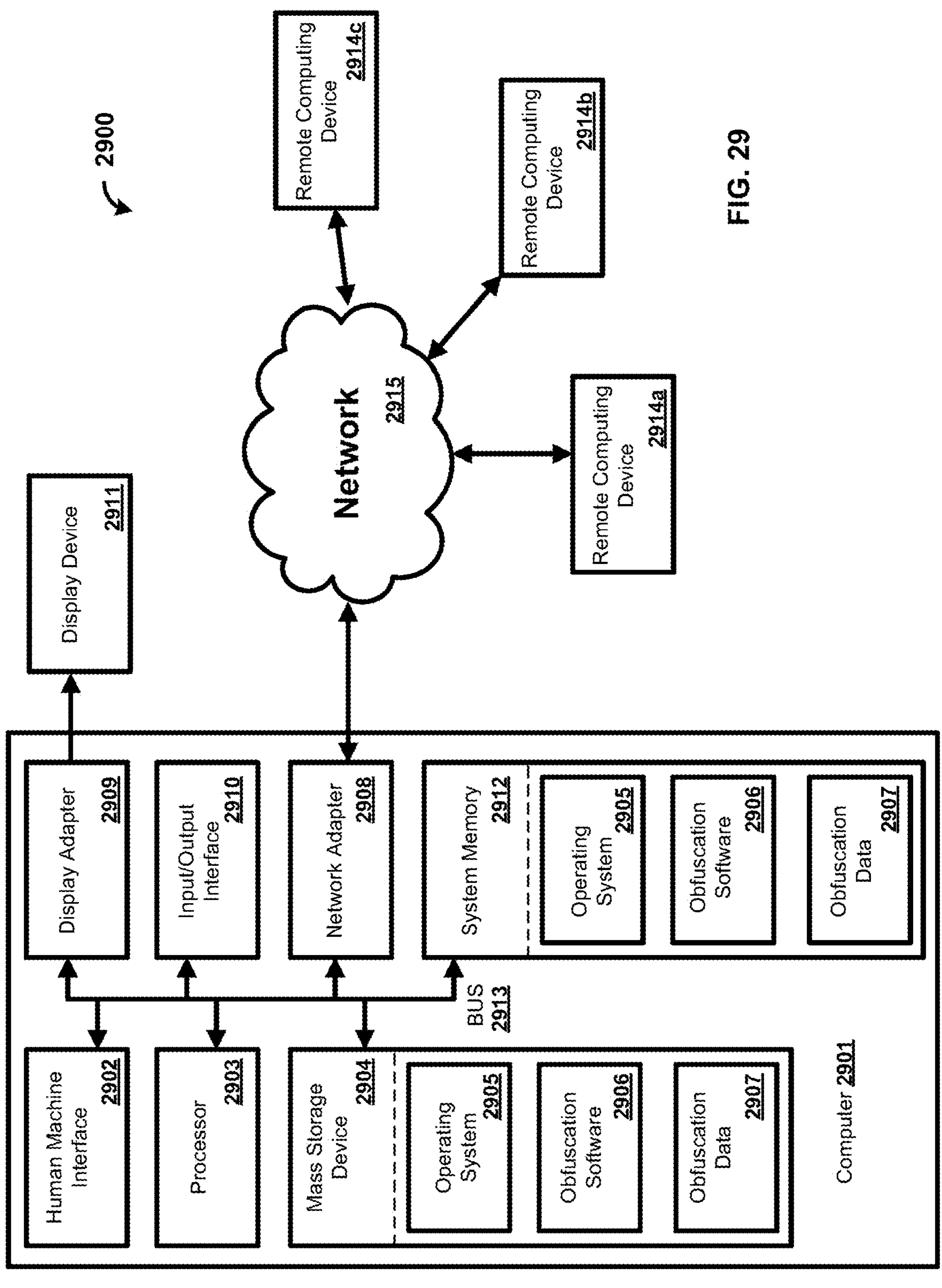
FIG. 29 is a block diagram illustrating an example computer for implementing the present methods and systems.

In an exemplary aspect, the methods and systems can be implemented on a computer 2901 as illustrated in FIG. 29 and described below. By way of example, the first device 104, the second device 106, and/or the third device 108 of FIG. 1 can be computers as illustrated in FIG. 29. Similarly, the methods and systems disclosed can utilize one or more computers to perform one or more functions in one or more locations. FIG. 29 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices.

Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 2901. The components of the computer 2901 can comprise, but are not limited to, one or more processors 2903, a system memory 2912, and a system bus 2913 that couples various system components including the one or more processors 2903 to the system memory 2912. The system can utilize parallel computing.

The system bus 2913 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 2913, and all buses specified in this description can also be implemented over a wired or wireless network connection and each of the subsystems, including the one or more processors 2903, a mass storage device 2904, an operating system 2905, obfuscation software 2906 (e.g., software for implementing obfuscation and/or unobfuscating data as disclosed herein), obfuscation data 2907, a network adapter 2908, the system memory 2912, an Input/Output Interface 2910, a display adapter 2909, a display device 2911, and a human machine interface 2902, can be contained within one or more remote computing devices 2914*a,b,c* at physically separate locations, connected through buses of this form, in effect implementing a fully distributed system.

The computer 2901 typically comprises a variety of computer readable media. Exemplary readable media can be any available media that is accessible by the computer 2901 and comprises, for example and not meant to be limiting, both volatile and non-volatile media, removable and non-removable media. The system memory 2912 comprises computer readable media in the form of volatile memory, such as random access memory (RAM), and/or non-volatile memory, such as read only memory (ROM). The system memory 2912 typically contains data such as the obfuscation data 2907 and/or program modules such as the operating system 2905 and the obfuscation software 2906 that are immediately accessible to and/or are presently operated on by the one or more processors 2903.

In another aspect, the computer 2901 can also comprise other removable/non-removable, volatile/non-volatile computer storage media. By way of example, FIG. 29 illustrates the mass storage device 2904 which can provide non-volatile storage of computer code, computer readable instructions, data structures, program modules, and other data for the computer 2901. For example and not meant to be limiting, the mass storage device 2904 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 2904, including by way of example, the operating system 2905 and the obfuscation software 2906. Each of the operating system 2905 and the obfuscation software 2906 (or some combination thereof) can comprise elements of the programming and the obfuscation software 2906. The obfuscation data 2907 can also be stored on the mass storage device 2904. The obfuscation data 2907 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 2901 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 2903 via the human machine interface 2902 that is coupled to the system bus 2913, but can be connected by other interface and bus structures, such as a parallel port, game port, an IEEE 1394 Port (also known as a Firewire port), a serial port, or a universal serial bus (USB).

In yet another aspect, the display device 2911 can also be connected to the system bus 2913 via an interface, such as the display adapter 2909. It is contemplated that the computer 2901 can have more than one display adapter 2909 and the computer 2901 can have more than one display device 2911. For example, the display device 2911 can be a monitor, an LCD (Liquid Crystal Display), or a projector. In addition to the display device 2911, other output peripheral devices can comprise components such as speakers (not shown) and a printer (not shown) which can be connected to the computer 2901 via the Input/Output Interface 2910. Any step and/or result of the methods can be output in any form to an output device. Such output can be any form of visual representation, including, but not limited to, textual, graphical, animation, audio, tactile, and the like. The display device 2911 and computer 2901 can be part of one device, or separate devices.

The computer 2901 can operate in a networked environment using logical connections to one or more remote computing devices 2914*a,b,c*. By way of example, a remote computing device can be a personal computer, portable computer, smartphone, a server, a router, a network computer, a peer device or other common network node, and so on. Logical connections between the computer 2901 and a remote computing device 2914*a,b,c* can be made via a network 2915, such as a local area network (LAN) and/or a general wide area network (WAN). Such network connections can be through the network adapter 2908. The network adapter 2908 can be implemented in both wired and wireless environments. Such networking environments are conventional and commonplace in dwellings, offices, enterprise-wide computer networks, intranets, and the Internet.

For purposes of illustration, application programs and other executable program components such as the operating system 2905 are illustrated herein as discrete blocks, although it is recognized that such programs and components reside at various times in different storage components of the computing device 2901, and are executed by the one or more processors 2903 of the computer. An implementation of the obfuscation software 2906 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:

receiving, by a device, a packet comprising one or more headers;

determining, based on the one or more headers, protocol identifier information;

generating, based on the protocol identifier information, one or more permutations of one or more protocol identifiers for the one or more headers;

determining a mapping of the one or more permutations of the one or more protocol identifiers;

determining, based on the mapping of the one or more permutations of the one or more protocol identifiers, a protocol identifier associated with the packet; and processing, based on the determining of the protocol identifier, the packet.

2. The method of claim 1, wherein the one or more headers comprise a first additional header and a second additional header, and wherein the first additional header comprises a first set of protocol identifier values for the second additional header, and the second additional header comprises a second set of protocol identifier values.

3. The method of claim 2, wherein the second additional header comprises a nonce value, and wherein the first set of protocol identifier values is based on the nonce value and a shared secret.

4. The method of claim 1, wherein the protocol identifier information comprises information associated with a set of protocol identifier values.

5. The method of claim 4, wherein the set of protocol identifier values is generated based on a permutation of the protocol identifier.

6. The method of claim 4, wherein a plurality of protocol identifiers is generated based on a shared secret, wherein the plurality of protocol identifiers comprises the set of protocol identifier values.

7. The method of claim 4, wherein the protocol identifier is obfuscated based on replacing, within the packet, the protocol identifier with the set of protocol identifier values.

8. The method of claim 4, wherein the protocol identifier is obfuscated based on inserting the set of protocol identifier values as a protocol number of a next header field of the packet, wherein the next header field indicates which protocol to use to process the one or more headers.

9. The method of claim 1, wherein the protocol identifier associated with the packet comprises a protocol number that identifies a protocol associated with the one or more headers in a field of the packet.

10. The method of claim 1, further comprising determining that the one or more permutations of the one or more protocol identifiers match one or more expected values.

11. An apparatus comprising:

one or more processors; and a memory storing processor-executable instructions that, when executed by the one or more processors, cause the apparatus to:

receive a packet comprising one or more headers;

determine, based on the one or more headers, protocol identifier information;

generate, based on the protocol identifier information, one or more permutations of one or more protocol identifiers for the one or more headers;

determine a mapping of the one or more permutations of the one or more protocol identifiers;

determine, based on the mapping of the one or more permutations of the one or more protocol identifiers, a protocol identifier associated with the packet; and process, based on the determining of the protocol identifier, the packet.

12. The apparatus of claim 11, wherein the one or more headers comprise a first additional header and a second additional header, and wherein the first additional header comprises a first set of protocol identifier values for the second additional header, and the second additional header comprises a second set of protocol identifier values.

13. The apparatus of claim 12, wherein the second additional header comprises a nonce value, and wherein the first set of protocol identifier values is based on the nonce value and a shared secret.

14. The apparatus of claim 11, wherein the protocol identifier information comprises information associated with a set of protocol identifier values.

15. The apparatus of claim 14, wherein the set of protocol identifier values is generated based on a permutation of the protocol identifier.

16. The apparatus of claim 14, wherein a plurality of protocol identifiers is generated based on a shared secret, wherein the plurality of protocol identifiers comprises the set of protocol identifier values.

17. The apparatus of claim 14, wherein the protocol identifier is obfuscated based on replacing, within the packet, the protocol identifier with the set of protocol identifier values.

18. The apparatus of claim 14, wherein the protocol identifier is obfuscated based on inserting the set of protocol identifier values as a protocol number of a next header field of the packet, wherein the next header field indicates which protocol to use to process the one or more headers.

19. The apparatus of claim 11, wherein the protocol identifier associated with the packet comprises a protocol number that identifies a protocol associated with the one or more headers in a field of the packet.

20. The apparatus of claim 11, wherein the processor-executable instructions, when executed by the one or more processors, further cause the apparatus to determine that the one or more permutations of the one or more protocol identifiers match one or more expected values.

21. One or more non-transitory computer-readable media storing processor-executable instructions that, when executed by at least one processor, cause the at least one processor to:

receive, by a device, a packet comprising one or more headers;

determine, based on the one or more headers, protocol identifier information;

generating, based on the protocol identifier information, one or more permutations of one or more protocol identifiers for the one or more headers;

determine a mapping of the one or more permutations of the one or more protocol identifiers;

determine, based on the mapping of the one or more permutations of the one or more protocol identifiers, a protocol identifier associated with the packet; and process, based on the determining of the protocol identifier, the packet.

22. The non-transitory computer-readable media of claim 21, wherein the one or more headers comprise a first additional header and a second additional header, and wherein the first additional header comprises a first set of protocol identifier values for the second additional header, and the second additional header comprises a second set of protocol identifier values.

23. The non-transitory computer-readable media of claim 22, wherein the second additional header comprises a nonce value, and wherein the first set of protocol identifier values is based on the nonce value and a shared secret.

24. The non-transitory computer-readable media of claim 21, wherein the protocol identifier information comprises information associated with a set of protocol identifier values.

25. The non-transitory computer-readable media of claim 24, wherein the set of protocol identifier values is generated based on a permutation of the protocol identifier.

26. The non-transitory computer-readable media of claim 24, wherein a plurality of protocol identifiers is generated based on a shared secret, wherein the plurality of protocol identifiers comprises the set of protocol identifier values.

27. The non-transitory computer-readable media of claim 24, wherein the protocol identifier is obfuscated based on replacing, within the packet, the protocol identifier with the set of protocol identifier values.

28. The non-transitory computer-readable media of claim 24, wherein the protocol identifier is obfuscated based on inserting the set of protocol identifier values as a protocol number of a next header field of the packet, wherein the next header field indicates which protocol to use to process the one or more headers.

29. The non-transitory computer-readable media of claim 21, wherein the protocol identifier associated with the packet comprises a protocol number that identifies a protocol associated with the one or more headers in a field of the packet.

30. The non-transitory computer-readable media of claim 21, wherein the processor-executable instructions, when executed by the at least one processor, further cause the at least one processor to determine that the one or more permutations of the one or more protocol identifiers match one or more expected values.

31. A system comprising:

a first computing device configured to send a packet comprising one or more headers;

a second computing device configured to:

receive the packet;

determine, based on the one or more headers, protocol identifier information;

generating, based on the protocol identifier information, one or more permutations of one or more protocol identifiers for the one or more headers;

determine a mapping of the one or more permutations of the one or more protocol identifiers;

determine, based on the mapping of the one or more permutations of the one or more protocol identifiers, a protocol identifier associated with the packet; and process, based on the determining of the protocol identifier, the packet.

32. The system of claim 31, wherein the one or more headers comprise a first additional header and a second additional header, and wherein the first additional header comprises a first set of protocol identifier values for the second additional header, and the second additional header comprises a second set of protocol identifier values.

33. The system of claim 32, wherein the second additional header comprises a nonce value, and wherein the first set of protocol identifier values is based on the nonce value and a shared secret.

34. The system of claim 31, wherein the protocol identifier information comprises information associated with a set of protocol identifier values.

35. The system of claim 34, wherein the first computing device is further configured to generate, based on a permutation of the protocol identifier, the set of protocol identifier values.

36. The system of claim 34, wherein the first computing device is further configured to:

generate, based on a shared secret, a plurality of protocol identifiers, wherein the plurality of protocol identifiers comprises the set of protocol identifier values.

37. The system of claim 34, wherein the first computing device is further configured to:

obfuscate, based on replacing, within the packet, the protocol identifier with the set of protocol identifier values, the protocol identifier.

38. The system of claim 34, wherein the first computing device is further configured to:

obfuscate, based on inserting the set of protocol identifier values as a protocol number of a next header field of the packet, wherein the next header field indicates which protocol to use to process the one or more headers.

39. The system of claim 31, wherein the protocol identifier associated with the packet comprises a protocol number that identifies a protocol associated with the one or more headers in a field of the packet.

40. The system of claim 31, wherein the second computing device is further configured to determine that the one or more permutations of the one or more protocol identifiers match one or more expected values.

* * * * *